(12) United States Patent
Oshima et al.

(10) Patent No.: US 11,644,172 B2
(45) Date of Patent: May 9, 2023

(54) HEADLIGHT DEVICE

(71) Applicant: Mitsubishi Electric Corporation, Tokyo (JP)

(72) Inventors: Ritsuya Oshima, Tokyo (JP); Masashige Suwa, Tokyo (JP); Muneharu Kuwata, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/774,865

(22) PCT Filed: Nov. 20, 2019

(86) PCT No.: PCT/JP2019/045443
§ 371 (c)(1),
(2) Date: May 6, 2022

(87) PCT Pub. No.: WO2021/100147
PCT Pub. Date: May 27, 2021

(65) Prior Publication Data
US 2022/0403999 A1 Dec. 22, 2022

(51) Int. Cl.
*F21S 41/657* (2018.01)
*F21S 41/19* (2018.01)

(52) U.S. Cl.
CPC ............. *F21S 41/657* (2018.01); *F21S 41/19* (2018.01)

(58) Field of Classification Search
CPC .......... F21S 41/657; F21S 41/19; B60Q 1/06; B60Q 1/068; B60Q 1/0683; B60Q 1/0686;
(Continued)

(56) References Cited

U.S. PATENT DOCUMENTS

2004/0246730 A1 12/2004 Takahashi

FOREIGN PATENT DOCUMENTS

| CN | 104121532 B * 5/2018 | ........... B60Q 1/0683 |
| DE | 10 2014 007 865 A1 12/2015 | |

(Continued)

OTHER PUBLICATIONS

English Translation of DE112015000584T5, Headlamp System, Kojima et al. (Year: 2016).*
(Continued)

*Primary Examiner* — Jong-Suk (James) Lee
*Assistant Examiner* — Glenn Zimmerman
(74) *Attorney, Agent, or Firm* — Xsensus LLP

(57) ABSTRACT

A headlight device includes an optical unit to emit light and a support mechanism to support the optical unit. The optical unit includes supported pins as a first supported part and supported groove parts as a second supported part. The support mechanism includes support groove parts as a first support part that is provided on a first straight line in a predetermined first direction and contacts the supported pins and support pins as a second support part that is provided on a second straight line in a second direction orthogonal to the first direction and contacts the supported groove parts. The support mechanism supports the optical unit to be freely rotatable around the first straight line passing through the support groove parts and freely rotatable around the second straight line passing through the support pins.

18 Claims, 21 Drawing Sheets

(58) Field of Classification Search
CPC . B60Q 1/076; B60Q 1/08; B60Q 1/10; B60Q 1/11; B60Q 1/115
See application file for complete search history.

(56) References Cited

FOREIGN PATENT DOCUMENTS

| | | | | | |
|---|---|---|---|---|---|
| DE | 112015000584 | T5 | * | 11/2016 | ............ B60Q 1/115 |
| EP | 1264731 | A1 | | 12/2002 | |
| GB | 2283556 | A | * | 5/1995 | ............ B60Q 1/076 |
| JP | 61-274077 | A | | 12/1986 | |
| JP | 4-65004 | A | | 3/1992 | |
| JP | 5-29856 | U | | 4/1993 | |
| JP | 8-292377 | A | | 11/1996 | |
| JP | 10283805 | A | * | 10/1998 | .......... B60Q 1/0683 |
| JP | 2004-306675 | A | | 11/2004 | |
| JP | 2006-321302 | A | | 11/2006 | |
| JP | 2008-233329 | A | | 10/2008 | |
| JP | 2010182587 | A | * | 8/2010 | ............ F21S 41/686 |
| JP | 2013-86747 | A | | 5/2013 | |
| WO | WO-2015115319 | A1 | * | 8/2015 | ............ B60Q 1/115 |
| WO | WO-2016189907 | A1 | * | 12/2016 | ............ B60Q 1/076 |

OTHER PUBLICATIONS

English Translation of WO-2015115319-A1; WO-2015115319-A1 (Year: 2015).*
English Translation of JP-2010182587-A; Mochizuki; (Year: 2010).*
International Search Report and Written Opinion dated Feb. 10, 2020, received for PCT Application PCT/JP2019/045443, Filed on Nov. 20, 2019, 9 pages including English Translation.
Notice of Reasons for Refusal dated Feb. 15, 2022, received for JP Application 2021-558096, 4 pages including English Translation.
Decision to Grant dated Mar. 29, 2022, received for JP Application 2021-558096, 5 pages including English Translation.
German Office Action dated Jan. 13, 2023 in corresponding German Patent Application No. 112019007836.4 (with English translation), 14 pages.

* cited by examiner

HEADLIGHT DEVICE

CROSS-REFERENCE TO RELATED APPLICATION

The present application is based on PCT filing PCT/JP2019/045443, filed Nov. 20, 2019, the entire contents of which are incorporated herein by reference.

TECHNICAL FIELD

The present invention relates to a headlight device.

BACKGROUND ART

Patent Reference 1 proposes a device including a support structure that supports a reflector of a headlight device for a vehicle and an optical axis changing structure that changes an inclination of the reflector. Each of the support structure and the optical axis changing structure has structure in which a spherical body at a tip end of a rod member fixed to the vehicle body is fit in a concave cap part fixed to the reflector's side.

PRIOR ART REFERENCE

Patent Reference

Patent Reference 1: Japanese Utility Model Application Publication No. 5-29856 (FIG. 1)

SUMMARY OF THE INVENTION

Problem to be Solved by the Invention

However, there is a problem in that the headlight device cannot be supported stably just by the structure in which the spherical body at the tip end of the rod member on the vehicle body's side is fit in the cap part on the reflector's side of the headlight device.

An object of the present invention, which has been made to resolve the above-described problem with the conventional technology, is to provide a headlight device capable of stably supporting an optical unit.

Means for Solving the Problem

A headlight device according to an aspect of the present invention includes an optical unit to emit light and a support mechanism to support the optical unit. The optical unit includes a first supported part and a second supported part. The support mechanism includes a first support part that is provided on a first straight line in a predetermined first direction and contacts the first supported part and a second support part that is provided on a second straight line in a second direction orthogonal to the first direction and contacts the second supported part. The support mechanism supports the optical unit to be freely rotatable around the first straight line passing through the first support part and freely rotatable around the second straight line passing through the second support part. One of the first supported part and the second supported part includes a pin and the other thereof is a groove extending in a third direction orthogonal to both the first direction and the second direction, and one of the first support part and the second support part that supports the groove includes a pin and the other thereof is a groove extending in the third direction.

Effect of the Invention

According to the present invention, the optical unit of the headlight device can be supported stably.

MODE FOR CARRYING OUT THE INVENTION

Figure 1:
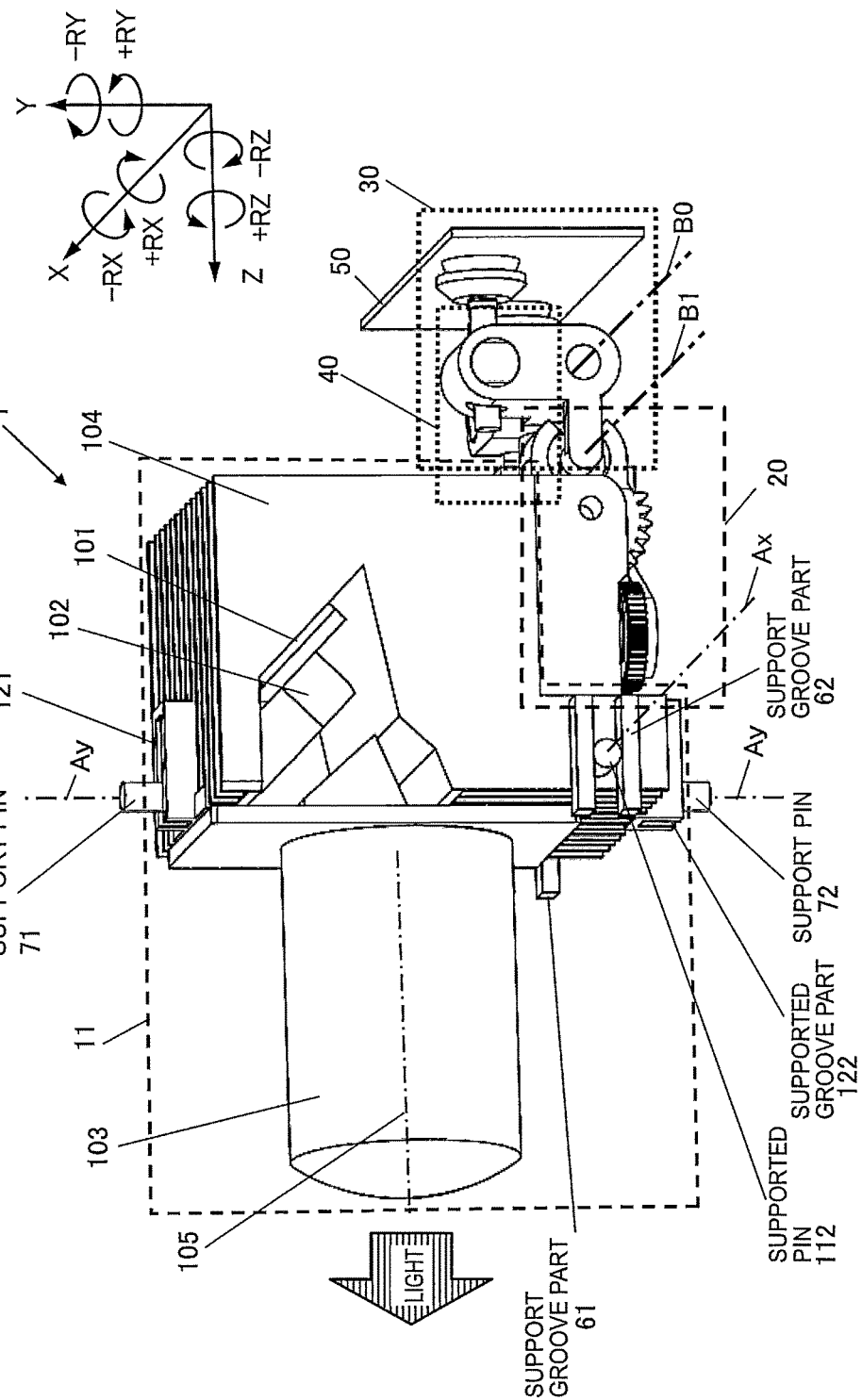
FIG. 1 is a perspective view schematically showing the structure of a headlight device according to a first embodiment of the present invention.

Headlight devices according to embodiments of the present invention will be described below with reference to the drawings. The following embodiments are just examples and a variety of modifications are possible within the scope of the present invention. Incidentally, throughout the drawings, the same or similar components are assigned the same reference character.

The headlight device according to each embodiment is an illumination device. The headlight device according to each embodiment includes an adjustment mechanism including a motor and an adjustment mechanism operated manually as adjustment mechanisms for changing an emission direction (i.e., optical axis direction) as the direction in which an optical unit emits light. In the headlight device according to each embodiment, the optical unit can be supported stably. The headlight device according to each embodiment is capable of stably supporting the optical unit even in a case where the headlight device is attached to an object in which vibration occurs (e.g., vehicle body).

In the drawings, coordinate axes of an XYZ orthogonal coordinate system and rotation directions around each coordinate axis are shown in order to facilitate the understanding of the invention. An X-axis is a coordinate axis in a first direction. A Y-axis is a coordinate axis in a second direction orthogonal to the first direction. A Z-axis is a coordinate axis in a third direction orthogonal to both the first direction and the second direction. In cases of a headlight device for a vehicle, the X-axis is a coordinate axis in a width direction of the vehicle. The Y-axis is a coordinate axis in a height direction of the vehicle. The Z-axis is a coordinate axis in a longitudinal direction of the vehicle. Further, a +Z-axis direction is approximately the emission direction of illuminating light emitted from the headlight device.

A +RZ direction is a clockwise direction as viewed in the +Z-axis direction, and a −RZ direction is a counterclockwise direction as a direction opposite to the +RZ direction. A +RX direction is a clockwise direction as viewed in the +X-axis direction, and a −RX direction is a counterclockwise direction as a direction opposite to the +RX direction. A +RY direction is a clockwise direction as viewed in the +Y-axis direction, and a −RY direction is a counterclockwise direction as a direction opposite to the +RY direction.

(1) First Embodiment (1-1) Configuration

<Headlight Device 1>

FIG. 1 is a perspective view schematically showing the structure of a headlight device 1 according to a first embodiment. As shown in FIG. 1, the headlight device 1 includes an optical unit 11 and a support mechanism to support the optical unit 11.

The support mechanism is fixed to a support part 50, for example. Only a part of the support part 50 is shown in FIG. 1. In a case where the headlight device 1 is a headlight device for a vehicle, the support part 50 is a structure on the vehicle body's side. In the first embodiment, the support mechanism includes a support groove part 61 and a support groove part 62 as a first support part and a support pin 71 and a support pin 72 as a second support part. The support groove parts 61 and 62 are arranged on a first straight line (i.e., a first axis) Ax at a predetermined position and extending in the first direction, that is, the X-axis direction. The support pins 71 and 72 are arranged on a second straight line (i.e., a second axis) Ay at a predetermined position and extending in the Y-axis direction as the second direction orthogonal to the first direction.

The second straight line Ay intersects with the first straight line Ax. However, the second straight line Ay does not necessarily have to intersect with the first straight line Ax. For example, the second straight line Ay may be arranged in the +Z-axis direction relative to the first straight line Ax.

Further, the headlight device 1 can include an optical axis drive unit 20, a vertical adjustment unit 30 as a first adjustment unit, and a transverse adjustment unit 40 as a second adjustment unit, as a mechanism for changing the emission direction of the light emitted from the optical unit 11 (i.e., a mechanism for changing the direction of an optical axis 105 of the optical unit 11). The headlight device 1 may also be configured to include one or two of the optical axis drive unit 20, the vertical adjustment unit 30 and the transverse adjustment unit 40. The headlight device 1 may include a drive mechanism other than the optical axis drive unit 20, the vertical adjustment unit 30 or the transverse adjustment unit 40 as a mechanism for changing the emission direction of the light emitted from the optical unit 11.

The optical axis drive unit 20 changes the direction of an optical axis 105 of the optical unit 11 in a vertical direction by means of electric drive. To "change the direction of the optical axis 105 in the vertical direction" means to change an inclination angle of the optical axis 105 with respect to a ZX plane orthogonal to the Y-axis. The vertical adjustment unit 30 is a mechanism for manually changing the direction of the optical axis 105 of the optical unit 11 in the vertical direction. The transverse adjustment unit 40 is a mechanism for manually changing the direction of the optical axis 105 of the optical unit 11 in a transverse direction. To "change the direction of the optical axis 105 in the transverse direction" means to change an angle of the optical axis 105 with respect to a YZ plane orthogonal to the X-axis. The vertical adjustment unit 30 and the transverse adjustment unit 40 are attached to the support part 50.

The optical unit 11 includes, for example, a light source unit 101, an optical member 102, an optical member 103, and a holding member 104 that holds these components. The optical unit 11 includes a supported pin 111 (shown in FIG. 3 which will be explained later) and a supported pin 112 as a first supported part and a supported groove part 121 and a supported groove part 122 as a second supported part. The supported pins 111 and 112 are fixed respectively to side faces of the holding member 104 on the +X-axis side and the −X-axis side. Namely, as viewed in the +Z-axis direction, the supported pins 111 and 112 are fixed to left and right side faces of the holding member 104. The supported pins 111 and 112 are referred to also as "left and right pins".

The supported groove parts 121 and 122 are fixed respectively to an upper surface of the holding member 104 as a surface on the +Y-axis side and a lower surface of the holding member 104 as a surface on the −Y-axis side. Namely, the supported groove parts 121 and 122 are fixed respectively to the upper surface and the lower surface of the holding member 104. The supported groove parts 121 and 122 are referred to also as "upper and lower groove parts" or "upper and lower supported parts". Each of the supported groove parts 121 and 122 includes a supported groove extending in the Z-axis direction. The supported groove is an oblong groove or an oblong hole, for example.

The support mechanism supporting the optical unit 11 includes the support groove parts 61 and 62 as the first support part and the support pins 71 and 72 as the second support part. The support groove parts 61 and 62 are respectively in contact with the supported pins 111 and 112. The support groove parts 61 and 62 are referred to also as "left and right groove parts". Each of the support groove parts 61 and 62 includes a support groove extending in the Z-axis direction as the third direction. The support groove is an oblong groove or an oblong hole, for example. The support groove parts 61 and 62 support the optical unit 11 by respectively keeping in contact with the supported pins 111 and 112 in the support grooves. Put another way, the supported pins 111 and 112 are supported to be movable (i.e., freely movable) along the support grooves of the support groove parts 61 and 62 while respectively contacting the support groove parts 61 and 62.

Further, the support groove parts 61 and 62 support the optical unit 11 to be rotatable (i.e., freely rotatable or freely pivotable) around a straight line connecting a position where the supported pin 111 and the support groove part 61 contact each other and a position where the supported pin 112 and the support groove part 62 contact each other. Namely, the optical unit 11 is supported to be freely rotatable approximately in the +RX direction and the −RX direction around the first straight line Ax passing through the support groove parts 61 and 62 (i.e., around an axis line connecting the support groove parts 61 and 62).

The support pins 71 and 72 are respectively in contact with the supported groove parts 121 and 122. The support pins 71 and 72 are referred to also as "upper and lower pins". The support pins 71 and 72 support the optical unit 11 by respectively keeping in contact with supported grooves of the supported groove parts 121 and 122. Put another way, the supported groove parts 121 and 122 are supported to be movable (i.e., freely movable) while respectively keeping their supported grooves in contact with the support pins 71 and 72.

Further, the support pins 71 and 72 support the optical unit 11 to be rotatable (i.e., freely rotatable or freely pivotable) around the second straight line Ay passing through the support pins 71 and 72. Namely, the optical unit 11 is supported to be freely rotatable in the +RY direction and the −RY direction around the second straight line Ay passing through the support pins 71 and 72 (i.e., around an axis line connecting the support pins 71 and 72).

<Light Source Unit 101>

The light source unit 101 emits light. From the viewpoint of lightening the load on the environment such as reduction in carbon dioxide ($CO_2$) emission and reduction in fuel consumption, the light source unit 101 is desired to be a semiconductor light source having high luminous efficiency. The semiconductor light source is a light-emitting diode (LED) or a laser diode (LD), for example. The light source unit 101 can also be a lamp light source including a halogen bulb or the like. Further, the light source unit 101 can also be a solid-state light source. Examples of the solid-state light source include an organic electroluminescence (organic EL) light source, a light source that makes a fluorescent substance emit light by irradiating the fluorescent substance with pumping light, and so forth. The semiconductor light source is a type of the solid-state light source.

The light source unit 101 is held by the holding member 104. The holding member 104 is a heat radiator, for example. In the first embodiment, the light source unit 101 is an LED light source.

<Optical Member 102>

The optical member 102 is a condensing optical element, for example. The optical member 102 condenses the light emitted from the light source unit 101. The optical member 102 is a condensing lens, for example. The optical member 102 can also be one or more mirrors, a combination of a lens and a mirror, a lens set made up of a plurality of lenses, or the like. The optical member 102 is attached to the holding member 104 or the light source unit 101. The optical member 102 is arranged in front of the light source unit 101 (i.e., on the left side of the light source unit 101 in FIG. 1). When the light source unit 101 is an LED light source having a large divergence angle, the optical unit 11 can be downsized and the light can be condensed efficiently by use of the optical member 102.

<Optical Member 103>

The optical member 103 allows the light emitted from the optical member 102 to pass through or reflects the light and thereby projects the light forward (i.e., approximately in the +Z-axis direction). The optical member 103 is a projection lens, for example. The optical member 103 changes the light distribution pattern of the light condensed by the optical member 102 and projects the light forward. The optical member 103 is arranged on a front side (i.e., the +Z-axis side) of the optical member 102. The optical member 103 is attached to the light source unit 101, the optical member 102 or the holding member 104. The shape of the optical member 103 as viewed from the +Z-axis side is a rectangular shape, for example. The optical member 103 is a cylindrical lens, a toroidal lens or the like, for example. However, the optical member 103 can also be a lens in a different shape.

<Holding Member 104>

The holding member 104 holds the light source unit 101, the optical member 102 and the optical member 103. The optical axis drive unit 20 is attached to the holding member 104. The holding member 104 is a heat radiator, for example. The holding member 104 efficiently radiates heat generated in the light source unit 101 and inhibits the temperature rise of the light source unit 101.

The upper surface and the lower surface of the holding member 104 as end faces in regard to the vertical direction (i.e., ±Y-axis directions) are respectively provided with the supported groove parts 121 and 122. Specifically, the supported groove part 121 is provided on the surface of the holding member 104 on the +Y-axis side and includes the supported groove extending in the Z-axis direction. The supported groove of the supported groove part 121 is an oblong groove or an oblong hole, for example. The supported groove part 122 is provided on the surface of the holding member 104 on the −Y-axis side and includes the supported groove extending in the Z-axis direction. The supported groove of the supported groove part 122 is an oblong groove or an oblong hole, for example.

End faces of the holding member 104 in the transverse direction (i.e., ±X-axis directions) are respectively provided with the supported pins 111 and 112. Specifically, the supported pin 111 is provided on the surface of the holding member 104 on the +X-axis side. The supported pin 111 is a projection part having an axis parallel to the X-axis. The supported pin 112 is provided on the surface of the holding member 104 on the −X-axis side. The supported pin 112 is a projection part having an axis parallel to the X-axis.

<Optical Unit 11>

The optical unit 11 includes the light source unit 101, the optical member 102, the optical member 103 and the holding member 104. The optical unit 11 is supported by the support mechanism on the support part 50, that is, on the vehicle body via the support part 50, so that the direction of the optical axis 105 of the light emitted from the optical unit 11 can be inclined in the vertical direction (i.e., the ±Y-axis directions) and in the transverse direction (i.e., the ±X-axis directions).

FIG. 1 shows an example in which the supported groove parts 121 and 122 and the supported pins 111 and 112 are fixed to the holding member 104 of the optical unit 11. However, these components may also be provided on a part other than the holding member 104 of the optical unit 11. For example, the supported groove parts 121 and 122 and the supported pins 111 and 112 may be provided on the optical member 103. The supported groove parts 121 and 122 and the supported pins 111 and 112 may be provided at arbitrary positions as long as the optical unit 11 can be supported at the positions.

<Optical Axis Drive Unit 20>

Figure 2:
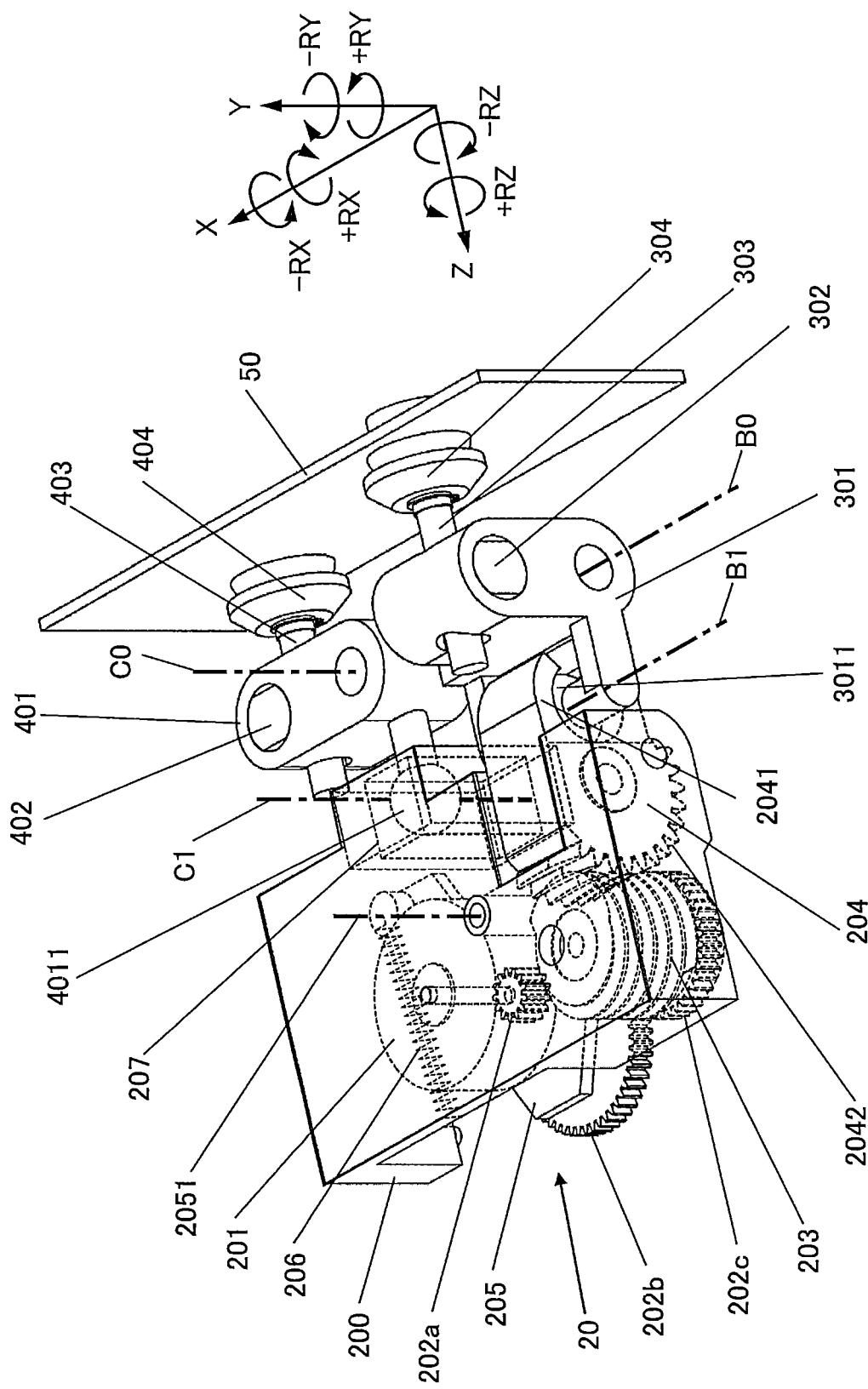
FIG. 2 is a perspective view schematically showing the structure of an optical axis drive unit, a vertical adjustment unit and a transverse adjustment unit of the headlight device according to the first embodiment.

FIG. 2 is a perspective view schematically showing the structure of the optical axis drive unit 20, the vertical adjustment unit 30 and the transverse adjustment unit 40 of the headlight device 1. The optical axis drive unit 20 includes, for example, a base member 200, a motor 201, a gear 202a, a gear 202b, a gear 202c, a worm screw 203, a support member 204, a rotary base 205, an elastic member 206, and a transverse adjustment groove part 207 having a transverse adjustment groove. The optical axis drive unit 20 applies force for rotating the optical unit 11 around the first straight line Ax passing through the support groove parts 61 and 62 to the optical unit 11.

The motor 201 is a drive force generation unit attached to the rotary base 205. The gear 202a is attached to a rotary shaft of the motor 201. The gear 202b is rotatably attached to the rotary base 205. The gear 202c and the worm screw 203 are rotatably attached to the rotary base 205. Further, the gear 202c and the worm screw 203 are linked with each other and operate in sync with each other. The rotary base 205 is attached to the base member 200 to be rotatable around an axis 2051. Further, the rotary base 205 and the base member 200 are linked with each other by the elastic member 206. The elastic member 206 is, for example, a spring that applies force in the +RY direction to the rotary base 205. The motor 201, the gears 202a, 202b and 202c and the worm screw 203 are attached to the rotary base 205. Thus, when the rotary base 205 rotates in the ±RY directions around the axis 2051, the mechanism made up of the motor 201, the gears 202a, 202b and 202c and the worm screw 203 attached to the rotary base 205 also rotates accompanying the rotation of the rotary base 205.

The support member 204 is rotatably attached to the base member 200 by a shaft parallel to the X-axis. The support member 204 includes a grip part 2041 and a worm wheel part 2042. The grip part 2041 is a part of the support member 204 on the −Z-axis side, and the worm wheel part 2042 is a part of the support member 204 on the +Z-axis side. The grip part 2041 includes a groove, namely, a concave part, extending in the X-axis direction. The groove of the grip part 2041 is an oblong hole or a U-shaped concave part, for example.

The gear 202a engages with the gear 202b. The gear 202b engages with the gear 202c. The worm screw 203 fixed to the gear 202c engages with the worm wheel part 2042 as a part of the support member 204. Thus, rotary drive force of the motor 201 is transmitted to the support member 204 including the worm wheel part 2042 via the gear 202a, the gear 202b, the gear 202c and the worm screw 203 and rotates the support member 204 in the ±RX directions. Further, a worm mechanism made up of the worm screw 203 and the worm wheel part 2042 is a non-back drive mechanism capable of continuously stopping the rotation of the worm wheel part 2042 even when no torque is generated by the motor 201. Thus, in the headlight device 1 according to the first embodiment, it is possible to drive the motor 201 when adjusting the direction of the optical axis 105 and not drive the motor 201 otherwise.

On the other hand, the rotary base 205 receives force in a direction for rotating the rotary base 205 in the +RY direction around the axis 2051 due to the elastic member 206. By this force, the worm screw 203 attached to the rotary base 205 is pressed against the worm wheel part 2042. Accordingly, a gap between a cog surface of the worm screw 203 and a cog surface of the worm wheel part 2042 becomes smaller and rattling in the worm mechanism can be reduced.

The base member 200 includes the transverse adjustment groove part 207. The transverse adjustment groove of the transverse adjustment groove part 207 is a groove, namely, a concave part, extending in the Y-axis direction. The transverse adjustment groove is an oblong hole or an oblong groove, for example.

The optical axis drive unit 20 is attached to the optical unit 11 via the base member 200. The structure of the optical axis drive unit 20 is not limited to that shown in FIG. 2. For example, it is also possible to provide a component forming the optical axis drive unit 20 directly on the holding member 104 without using the base member 200.

<Vertical Adjustment Unit 30>

The vertical adjustment unit 30 includes a vertical adjustment link 301, a nut part 302, an adjustment screw 303 and a stopper 304, for example. The vertical adjustment link 301 includes a vertical coupling part 3011. The vertical coupling part 3011 is linked with a connection position (i.e., the position of a vertical adjustment axis B1) of the optical axis drive unit 20 and applies force for rotating the optical unit 11 in the ±RX directions around the first straight line Ax passing through the support groove parts 61 and 62 to the optical unit 11 via the optical axis drive unit 20. For example, the vertical coupling part 3011 is a convex part in a spherical shape. Thus, the optical axis drive unit 20 includes the grip part 2041 having a groove as a first concave part, and the vertical adjustment unit 30 includes the vertical coupling part 3011 in the spherical shape as a first convex part that is fit in the concave part of the grip part 2041. Further, the vertical coupling part 3011 is held in the groove of the grip part 2041 to be freely rotatable. Incidentally, in a rotary drive range around the first straight line, there exists a position where the supported pins 111 and 112 and the vertical adjustment axis B1 become parallel to the first direction.

The vertical adjustment link 301 is attached to the support part 50 to be rotatable around a vertical rotation axis B0. The vertical rotation axis B0 is an axis parallel to the X-axis, for example. Further, in the first embodiment, the Y-axis direction position of the vertical adjustment axis B1 differs from the Y-axis direction position of the first straight line Ax. An angle α (shown in FIG. 19 which will be explained later) of a straight line passing through the vertical adjustment axis B1 and orthogonally intersecting with the first straight line Ax with respect to the ZX plane is less than or equal to 45 degrees. Preferably, this angle α is less than or equal to 30 degrees. More preferably, this angle α is less than or equal to 10 degrees. For example, the second direction (i.e., Y-axis direction) position of the connection position where the optical axis drive unit 20 and the vertical adjustment unit 30 are connected to each other is desired to be within ±1 cm of the second direction position of the first straight line Ax.

The nut part 302 is situated on the +Y-axis side of the vertical adjustment link 301. The nut part 302 is held by the vertical adjustment link 301 to be rotatable around the X-axis (i.e., in the ±RX directions). The nut part 302 internally includes a spiral groove extending in a direction orthogonal to the X-axis, for example.

The adjustment screw 303 is inserted in the nut part 302. The adjustment screw 303 includes a screw part having a spiral groove extending in a lengthwise direction on its outer periphery, for example. Namely, the screw part of the adjustment screw 303 is engaged with the spiral groove of the nut part 302.

The −Z-axis side of the adjustment screw 303 is held by the support part 50. Specifically, the −Z-axis side of the adjustment screw 303 is attached to the support part 50 to be rotatable. Namely, the adjustment screw 303 is held by the support part 50 to allow for rotational operations in the ±RX directions, the ±RY directions and the ±RZ directions around one certain point.

The adjustment screw 303 is inserted in the stopper 304. The stopper 304 supports the adjustment screw 303 on the support part 50 so that the adjustment screw 303 is rotatable in the ±RX directions, the ±RY directions and the ±RZ directions with respect to the support part 50.

In the first embodiment, the amount of rotation of the vertical adjustment link 301 with respect to the support part 50 around the vertical rotation axis B0 can be adjusted by the rotational operation of the adjustment screw 303 around its axis. This amount of rotation corresponds to the inclination angle of the direction of the optical axis 105 of the optical unit 11.

<Transverse Adjustment Unit 40>

The transverse adjustment unit 40 includes a transverse adjustment link 401, a nut part 402, an adjustment screw 403 and a stopper 404, for example. The transverse adjustment link 401 includes a transverse coupling part 4011. For example, the transverse coupling part 4011 is a convex part in a spherical shape. The transverse adjustment link 401 is attached to the support part 50 to be rotatable around a transverse rotation axis C0. The transverse rotation axis C0 is an axis parallel to the Y-axis, for example.

The nut part 402 is situated on the +X-axis side of the transverse adjustment link 401. The nut part 402 is held by the transverse adjustment link 401 to be rotatable around the Y-axis (i.e., in the ±RY directions). The nut part 402 internally includes a spiral groove extending in a direction orthogonal to the Y-axis, for example.

The adjustment screw 403 is inserted in the nut part 402. The adjustment screw 403 includes a screw part having a spiral groove extending in a lengthwise direction on its outer periphery, for example. Namely, the screw part of the adjustment screw 403 is engaged with the spiral groove of the nut part 402.

The −Z-axis side of the adjustment screw 403 is held by the support part 50. Specifically, the −Z-axis side of the adjustment screw 403 is attached to the support part 50 to be rotatable. Namely, the adjustment screw 403 is held by the support part 50 to allow for rotational operations in the ±RX directions, the ±RY directions and the ±RZ directions around one certain point.

The adjustment screw 403 is inserted in the stopper 404. The stopper 404 supports the adjustment screw 403 on the support part 50 so that the adjustment screw 403 is rotatable in the ±RX directions, the ±RY directions and the ±RZ directions with respect to the support part 50.

In the first embodiment, the amount of rotation of the transverse adjustment link 401 with respect to the support part 50 around the transverse rotation axis C0 can be adjusted by the rotational operation of the adjustment screw 403 around its axis.

<Support Part 50>

The support part 50 is, for example, a structure on the vehicle body's side of the vehicle or a member fixed to the structure. The support part 50 is, for example, a housing member containing the headlight device 1 or a bracket member fixed inside the headlight device 1. In short, the support part 50 can be any member as long as the member is fixed to the vehicle. For example, the support part 50 can be the vehicle itself.

The support part 50 is provided with the support pins 71 and 72. The support pin 71 is a pin having an axis parallel to the Y-axis, and an end part of the support pin 71 on the +Y-axis side is fixed to the support part 50, for example. The support pin 72 is a pin having an axis parallel to the Y-axis, and an end part of the support pin 72 on the −Y-axis side is fixed to the support part 50, for example.

Further, the support part 50 is provided with the support groove parts 61 and 62. The support groove part 61 includes the support groove extending in the Z-axis direction. This support groove is an oblong hole or an oblong groove, for example. For example, the support groove part 61 is attached on the support part 50 to be situated on the +X-axis side of the holding member 104. The support groove part 62 includes the support groove extending in the Z-axis direction. This support groove is an oblong hole or an oblong groove, for example. For example, the support groove part 62 is attached on the support part 50 to be situated on the −X-axis side of the holding member 104.

(1-2) Operation

<Operation of Optical Unit 11>

Figure 3:
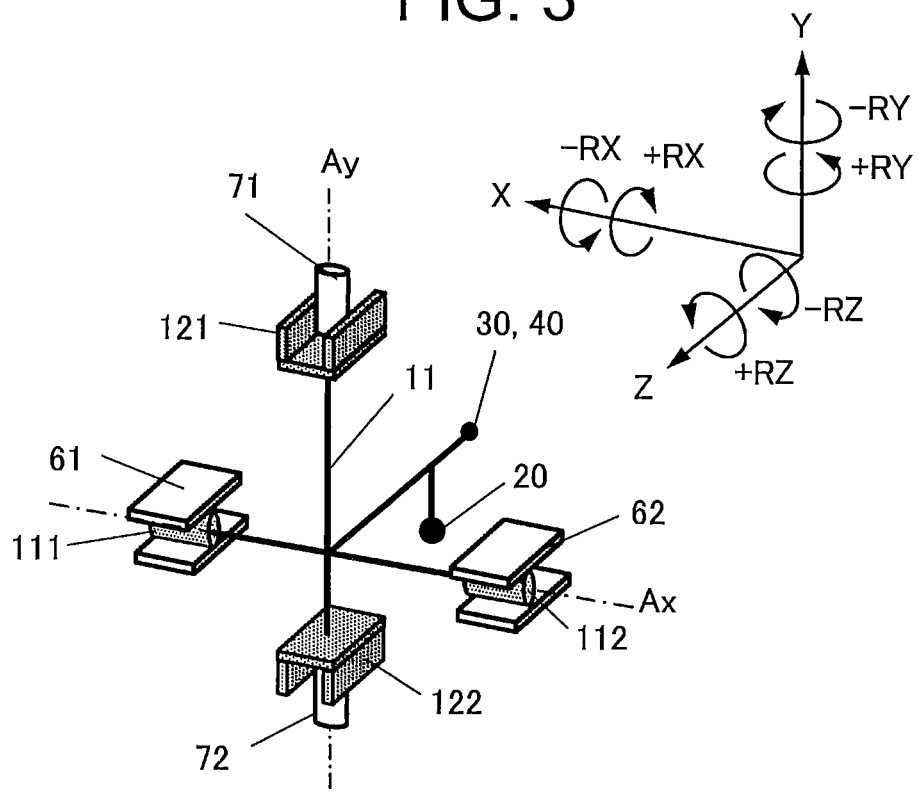
FIG. 3 is an explanatory diagram showing a supported part of an optical unit of the headlight device according to the first embodiment and a support part that supports the supported part.
Figure 4:
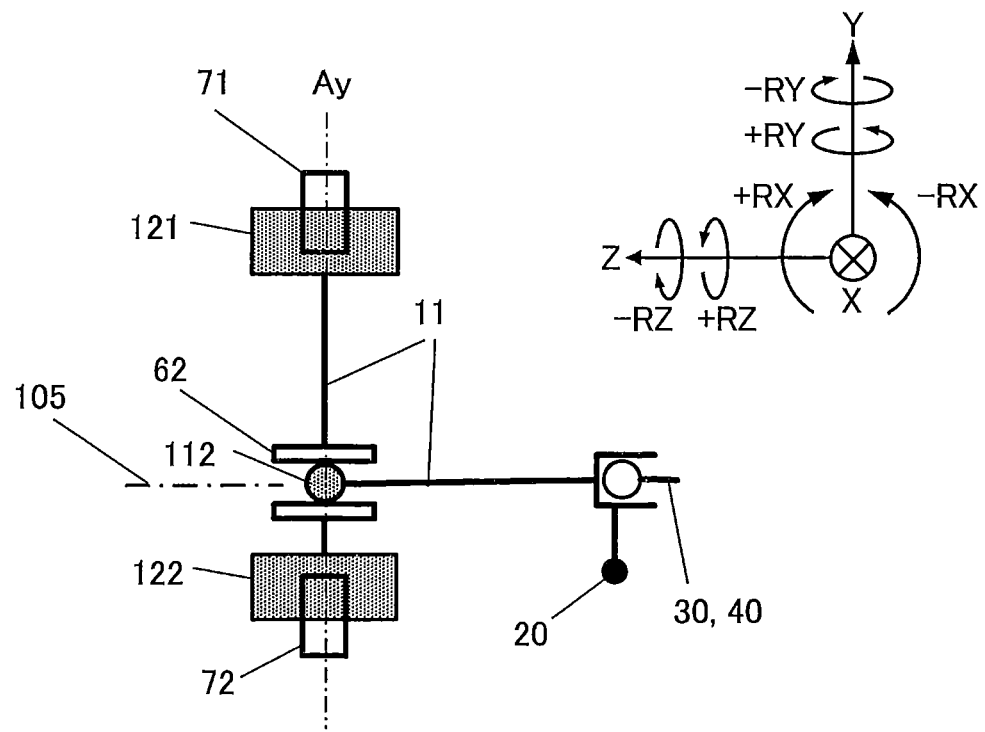
FIG. 4 is an explanatory diagram showing the operation of the headlight device shown in FIG. 1 to FIG. 3.
Figure 5:
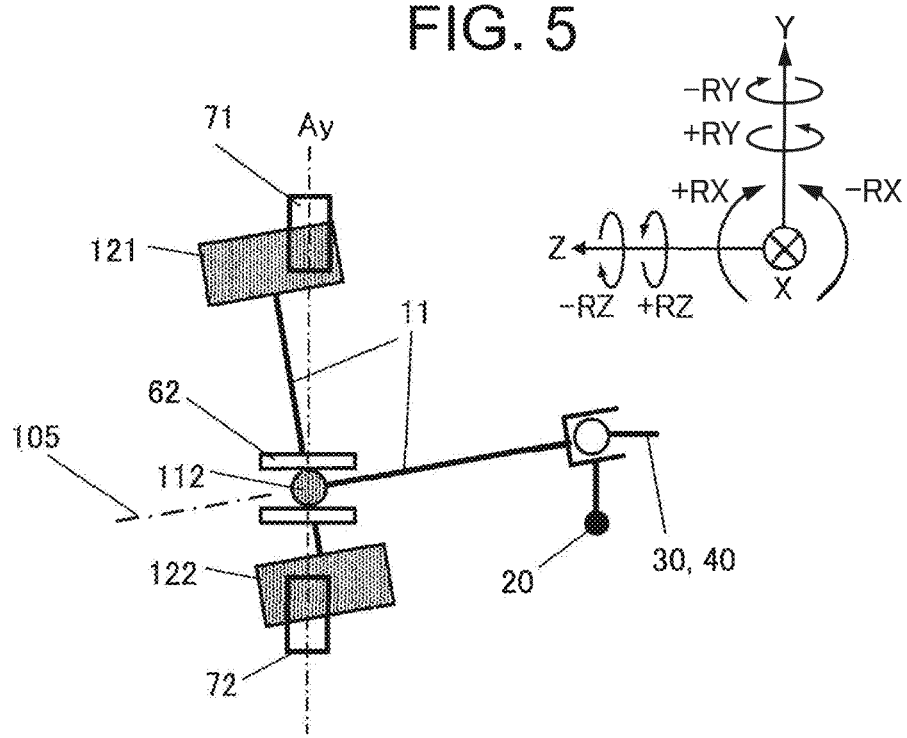
FIG. 5 is an explanatory diagram showing the operation of the headlight device shown in FIG. 1 to FIG. 3.

FIG. 3 is an explanatory diagram showing the supported pins 111 and 112 and the supported groove parts 121 and 122 of the optical unit 11 of the headlight device 1, the support groove parts 61 and 62, and the support pins 71 and 72. FIG. 4 and FIG. 5 are explanatory diagrams showing the operation of the headlight device 1 shown in FIG. 1 to FIG. 3.

The optical unit 11 is provided with the supported groove parts 121 and 122. The support part 50 is provided with the support pins 71 and 72 on the second straight line Ay. The support pin 71 is inserted in the supported groove of the supported groove part 121. The support pin 72 is inserted in the supported groove of the supported groove part 122.

The optical unit 11 is provided with the supported pins 111 and 112. The support part 50 is provided with the support groove parts 61 and 62 on the first straight line Ax. The supported pin 111 is inserted in the support groove of the support groove part 61. The supported pin 112 is inserted in the support groove of the support groove part 62.

In the optical unit 11 in the first embodiment, three freedoms: rotational operation around the Z-axis (i.e., in the ±RZ directions), translational operation (i.e., linear movement) in the X-axis direction, and translational operation in the Y-axis direction, are restricted by the support part 50. Namely, in the optical unit 11 in the first embodiment, three freedoms: translational operation (i.e., linear movement) in the Z-axis direction, rotational operation around the X-axis (i.e., in the ±RX directions), and rotational operation around the Y-axis (i.e., in the ±RY directions), are allowed for by the contact of the supported groove parts 121 and 122 with the support pins 71 and 72 and the contact of the supported pins 111 and 112 with the support groove parts 61 and 62.

The vertical coupling part 3011 as a part of the vertical adjustment link 301 of the vertical adjustment unit 30 is inserted in the grip part 2041 as a part of the support member 204 of the optical axis drive unit 20. Namely, the vertical coupling part 3011 in a spherical shape is rotatably fit in the grip part 2041's groove extending in the X-axis direction. Since the vertical coupling part 3011 is in a spherical shape, the grip part 2041 is restricted by the vertical coupling part 3011 in the translational operation in the Y-axis direction and the translational operation in the Z-axis direction. The vertical adjustment axis B1 is an axis parallel to the X-axis at a connection position of the grip part 2041 and the vertical coupling part 3011.

The support member 204 including the grip part 2041 is linked with the optical unit 11 via the optical axis drive unit 20. Therefore, the translational freedom in the Z-axis direction, the rotational freedom around the X-axis and the rotational freedom around the Y-axis of the optical unit 11 allowed for by the support part 50 are subject to restriction by the grip part 2041 and the vertical coupling part 3011.

The transverse coupling part 4011 included in the transverse adjustment link 401 of the transverse adjustment unit 40 is inserted in the transverse adjustment groove part 207 included in the base member 200 of the optical axis drive unit 20. Namely, the transverse coupling part 4011 in a spherical shape is rotatably fit in the transverse adjustment groove part 207's groove, namely, a concave part, extending in the Y-axis direction. Since the transverse coupling part 4011 is in a spherical shape, the base member 200 is restricted in the translational operation in the X-axis direction with respect to the transverse coupling part 4011. A transverse adjustment axis C1 is an axis parallel to the Y-axis at a connection position of the transverse adjustment groove part 207 and the transverse coupling part 4011. Incidentally, the second straight line Ay is situated in the light emission direction, namely, the +Z-axis direction, relative to the transverse coupling part 4011.

The transverse adjustment unit 40 is linked with the optical unit 11 via the base member 200 and the optical axis drive unit 20. On the other hand, the optical unit 11 is allowed the rotational freedom around the Y-axis by the support part 50, the grip part 2041 and the vertical coupling part 3011. Therefore, the optical unit 11 is totally restricted with respect to the support part 50 by the transverse adjustment groove part 207 and the transverse coupling part 4011.

<Operation of Vertical Adjustment Unit 30>

Optical axis adjustment in the vertical direction by manual operation is executed when deviation in the direction of the optical axis 105 occurring when the headlight device 1 is attached to the vehicle body is corrected in the vertical direction, for example.

For example, when the adjustment is made so that the optical axis 105 of the optical unit 11 is pointed in a forward and obliquely upward direction, the nut part 302 is pushed forward by rotating the adjustment screw 303 of the vertical adjustment unit 30 around its axis. Since the nut part 302 is arranged to be rotatable with respect to the vertical adjustment link 301, the vertical adjustment link 301 is leaned in the −RX direction around the vertical rotation axis B0 as a rotation center. By the leaning of the vertical adjustment link 301 in the −RX direction, a coupling position of the vertical coupling part 3011 and the grip part 2041 moves towards the −Y-axis side. The grip part 2041 is linked with the optical unit 11, and the optical unit 11 is supported by the support part 50 to be rotatable at an axial position of the supported pins 111 and 112. Therefore, when the coupling position of the vertical coupling part 3011 and the grip part 2041 moves towards the −Y-axis side, the optical unit 11 rotates around the axial position of the supported pins 111 and 112, and consequently, the optical axis 105 can be pointed in the forward and obliquely upward direction. When the adjustment is made so as to point the optical axis 105 in a forward and obliquely downward direction, the adjustment screw 303 may be rotated in a direction opposite to the direction in the above description.

<Operation of Transverse Adjustment Unit 40>

Optical axis adjustment in the transverse direction by manual operation is executed when deviation in the direction of the optical axis 105 occurring when the headlight device 1 is attached to the vehicle body is corrected in the transverse direction, for example.

For example, when the adjustment is made so that the optical axis 105 of the optical unit 11 is pointed in a forward and obliquely rightward direction, the nut part 402 is pushed forward by rotating the adjustment screw 403 of the transverse adjustment unit 40 around its axis. Since the nut part 402 is arranged to be rotatable with respect to the transverse adjustment link 401, the transverse adjustment link 401 is rotated in the +RY direction around the transverse rotation axis C0 as a rotation center. By the rotation of the transverse adjustment link 401 in the +RY direction, a coupling position of the transverse coupling part 4011 and the transverse adjustment groove part 207 moves towards the −X-axis side. The transverse adjustment groove part 207 is linked with the optical unit 11, and the optical unit 11 is supported with respect to the support part 50 to be rotatable at an axial position of the support pins 71 and 72. Therefore, when the coupling position of the transverse coupling part 4011 and the transverse adjustment groove part 207 moves towards the −X-axis side, the optical unit 11 rotates around the axial position of the support pins 71 and 72, and consequently, the optical axis 105 can be pointed in the forward and obliquely rightward direction. When the adjustment is made so as to point the optical axis 105 in a forward and obliquely leftward direction, the adjustment screw 403 may be rotated in a direction opposite to the direction in the above description.

<Operation of Optical Axis Drive Unit 20>

Figure 6:
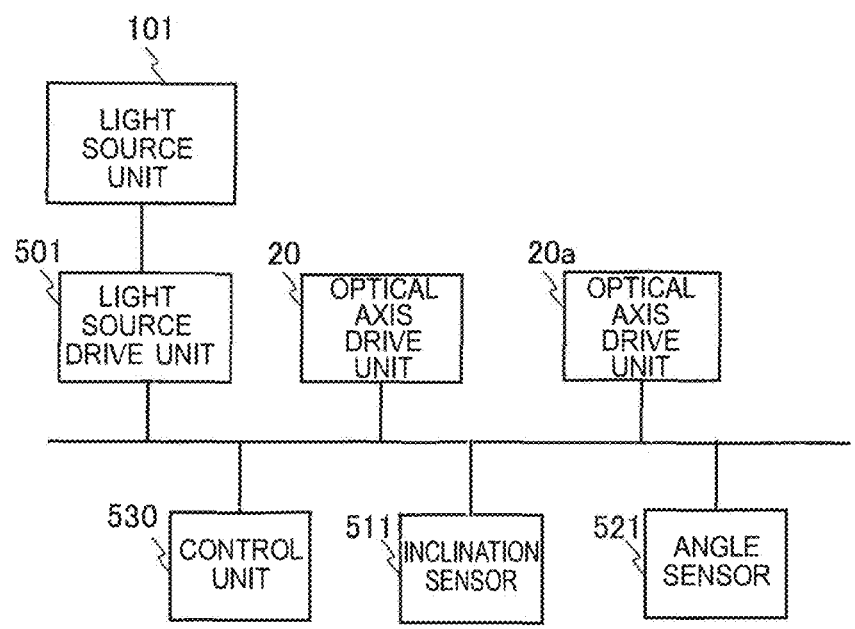
FIG. 6 is a functional block diagram showing a configuration of a control system of the headlight device according to the first embodiment.

FIG. 6 is a functional block diagram showing a configuration of a control system of the headlight device 1. As shown in FIG. 6, the headlight device 1 includes the light source unit 101, a light source drive unit 501 that drives the light source unit 101, an inclination sensor 511, the optical axis drive unit 20, and a control unit 530. For example, the light source drive unit 501 is a light source drive circuit, the optical axis drive unit 20 is a motor drive circuit that drives the motor 201, and the control unit 530 is a control circuit. All or part of these circuits may be implemented by a memory for storing a program and a processor for executing the program. Further, the headlight device 1 may include an angle sensor 521 and another optical axis drive unit 20a.

The inclination sensor 511 detects an inclination of the headlight device 1, that is, an inclination of the vehicle, on which the headlight device 1 is mounted, in the longitudinal direction of the vehicle. The inclination is an inclination angle with respect to a reference horizontal plane as a predetermined reference plane. Namely, the inclination sensor 511 detects the inclination angle as the inclination of the optical axis 105 of the optical unit 11 with respect to the ZX plane as a first reference plane orthogonal to the Y-axis direction. The control unit 530 controls the optical axis drive unit 20 based on the inclination angle detected by the inclination sensor 511. The control unit 530 controls the emission direction of the light emitted from the headlight device 1, for example. The control unit 530 executes the control so that the emission direction of the light emitted from the headlight device 1 does not change depending on the inclination of the vehicle body, for example.

The angle sensor 521 detects an angle of the headlight device 1 in the transverse direction. The angle is an angle with respect to a reference vertical plane as a predetermined reference plane. Specifically, the angle is an angle with respect to a reference plane as the YZ plane orthogonal to the X-axis. The angle sensor 521 detects an angle of the optical axis 105 of the optical unit 11 with respect to the YZ plane as a second reference plane orthogonal to the X-axis direction (e.g., an angle in a horizontal direction). The control unit 530 controls the optical axis drive unit 20a based on the angle detected by the angle sensor 521. The control unit 530 controls the emission direction of the light emitted from the headlight device 1, for example. The control unit 530 executes the control so that the emission direction of the light emitted from the headlight device 1 does not change depending on the inclination of the vehicle body, for example.

For example, when a passenger is seated on the rear seat of the vehicle or luggage is loaded in the rear trunk, the vehicle body is inclined in a forward and obliquely upward direction. In such cases, the optical axis drive unit 20 regarding the vertical direction by means of electric drive automatically adjusts the direction of the optical axis 105 based on a detection signal outputted from the inclination sensor 511 attached to the vehicle body. It is also possible to electrically adjust the direction of the optical axis 105 by operating a switch for operating the optical axis drive unit 20.

When the motor 201 is driven, the worm screw 203 is rotated via the gears 202a, 202b and 202c. By the rotation of the worm screw 203, the support member 204 is rotated in the ±RX directions, and the support member 204 is rotated in the ±RX directions with respect to the vertical adjustment link 301 by the grip part 2041 and the vertical coupling part 3011. Since the vertical adjustment link 301 does not move with respect to the support part 50 unless the adjustment screw 303 rotates, the optical axis drive unit 20 including the support member 204 and the optical unit 11 fixed to the optical axis drive unit 20 move in the ±Y-axis directions due to the rotation of the support member 204.

On the other hand, the optical unit 11 is supported to be rotatable with respect to the support part 50 at the axial position of the supported pins 111 and 112 and its translational operation in the Y-axis direction is restricted. Therefore, the optical unit 11 rotates in the ±RX directions due to the rotation of the support member 204.

(1-3) Effect

As described above, in the headlight device 1 according to the first embodiment, the optical unit 11 can be supported stably. Especially, the optical unit 11 can be supported stably even when the headlight device 1 is installed in a vibrating environment.

Further, the headlight device 1 according to the first embodiment is capable of reducing failures such as a failure due to load concentration in the support mechanism for the optical unit 11 and realizing the supporting with high durability even in a vibrating environment.

Furthermore, the headlight device 1 is capable of adjusting the optical axis 105 so that the light does not directly enter the eyes of the driver of an oncoming vehicle.

Moreover, in the headlight device 1 according to the first embodiment, even when the direction of the optical axis 105 of the optical unit 11 is inclined in the vertical direction by the optical axis drive unit 20 or the vertical adjustment unit 30, the rotation axis (i.e., the second straight line Ay shown in FIG. 5) at the time of adjusting the direction of the optical axis 105 in the transverse direction is parallel to the axis of the support pins 71 and 72 and parallel to the Y-axis. Namely, the inclination angle of the direction of the optical axis 105 of the optical unit 11 in the vertical direction can be kept constant even when the direction of the optical axis 105 of the optical unit 11 is adjusted in the transverse direction.

(1-4) Modification

Figure 7:
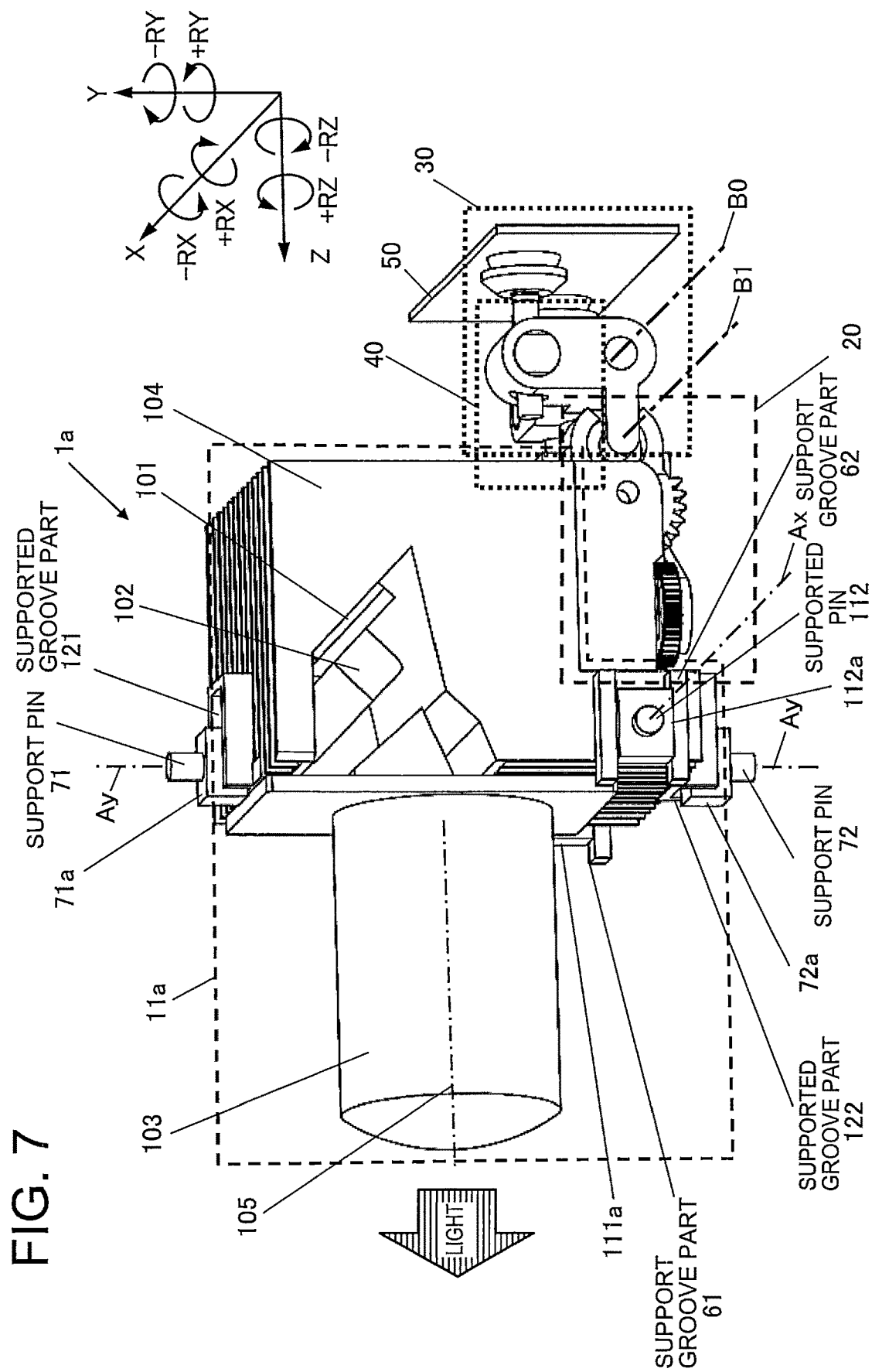
FIG. 7 is a perspective view schematically showing the structure of a headlight device according to a modification of the first embodiment.

FIG. 7 is a perspective view schematically showing the structure of a headlight device 1a according to a modification of the first embodiment. In FIG. 7, each component identical or corresponding to a component shown in FIG. 1 is assigned the same reference character as in FIG. 1. The headlight device 1a differs from the headlight device 1 shown in FIG. 1 in including supported spacers 111a and 112a respectively surrounding the supported pins 111 and 112 and including support spacers 71a and 72a respectively surrounding the support pins 71 and 72.

Figure 8:
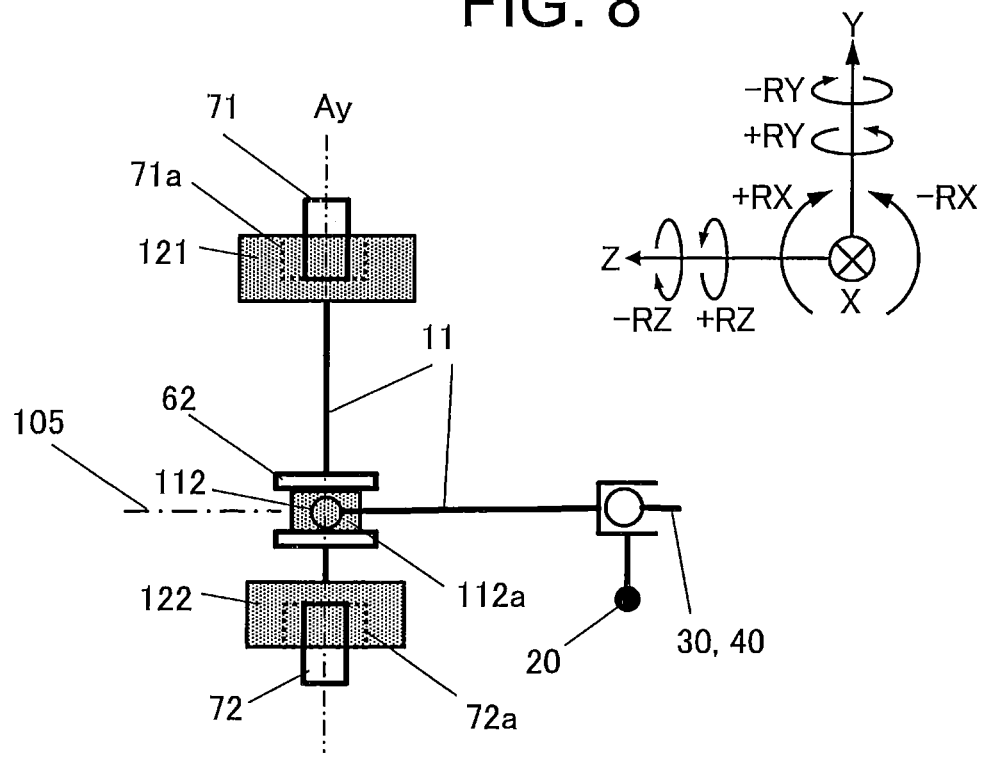
FIG. 8 is an explanatory diagram showing the operation of the headlight device shown in FIG. 7.
Figure 9:
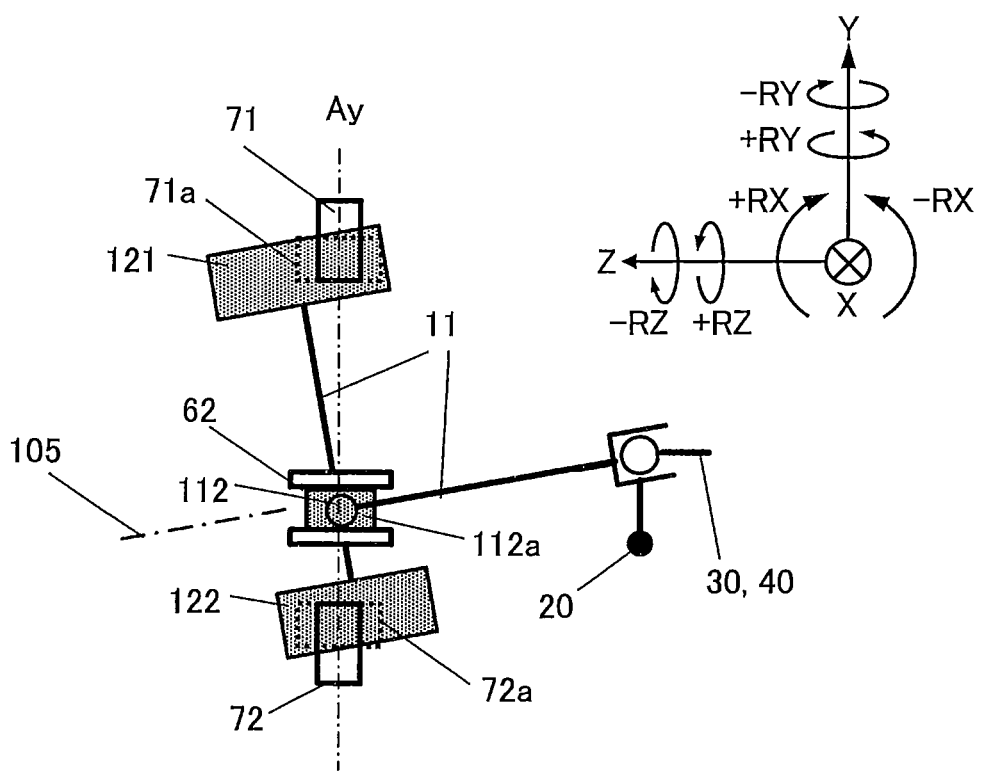
FIG. 9 is an explanatory diagram showing the operation of the headlight device shown in FIG. 7.

FIG. 8 and FIG. 9 are explanatory diagrams showing the operation of the headlight device 1a shown in FIG. 7. The support spacer 71a is inserted in the supported groove of the supported groove part 121. The support spacer 71a has a hole in which the support pin 71 is inserted. The support spacer 72a is inserted in the supported groove of the supported groove part 122. The support spacer 72a has a hole in which the support pin 72 is inserted.

The supported spacer 111a is inserted in the support groove of the support groove part 61. The supported spacer 111a has a hole in which the supported pin 111 is inserted. The supported spacer 112a is inserted in the support groove of the support groove part 62. The supported spacer 112a has a hole in which the supported pin 112 is inserted.

By the support spacers 71a and 72a and the supported spacers 111a and 112a, the performance of the support part 50 for holding the optical unit 11 can be increased further. Further, by the support spacers 71a and 72a and the supported spacers 111a and 112a, rattling between the optical unit 11 and the support part 50 can be reduced and that makes it possible to hold the optical unit 11 more stably.

Assuming that a surface including the axis of the supported pins 111 and 112 provided on the holding member 104 and the vertical adjustment axis B1 where the optical axis drive unit 20 and the vertical adjustment unit 30 are connected to each other and a surface formed by loci of movement of the axis of the supported pins 111 and 112 are infinite surfaces, it is desirable to configure the headlight device so that an angle formed by intersection of the two surface is an acute angle. With this configuration, a pressure angle of the supported pins 111 and 112 and the support groove parts 61 and 62 becomes small and smoother operation of the optical unit 11 becomes possible.

(2) Second Embodiment (2-1) Configuration

<Headlight Device 2>

Figure 10:
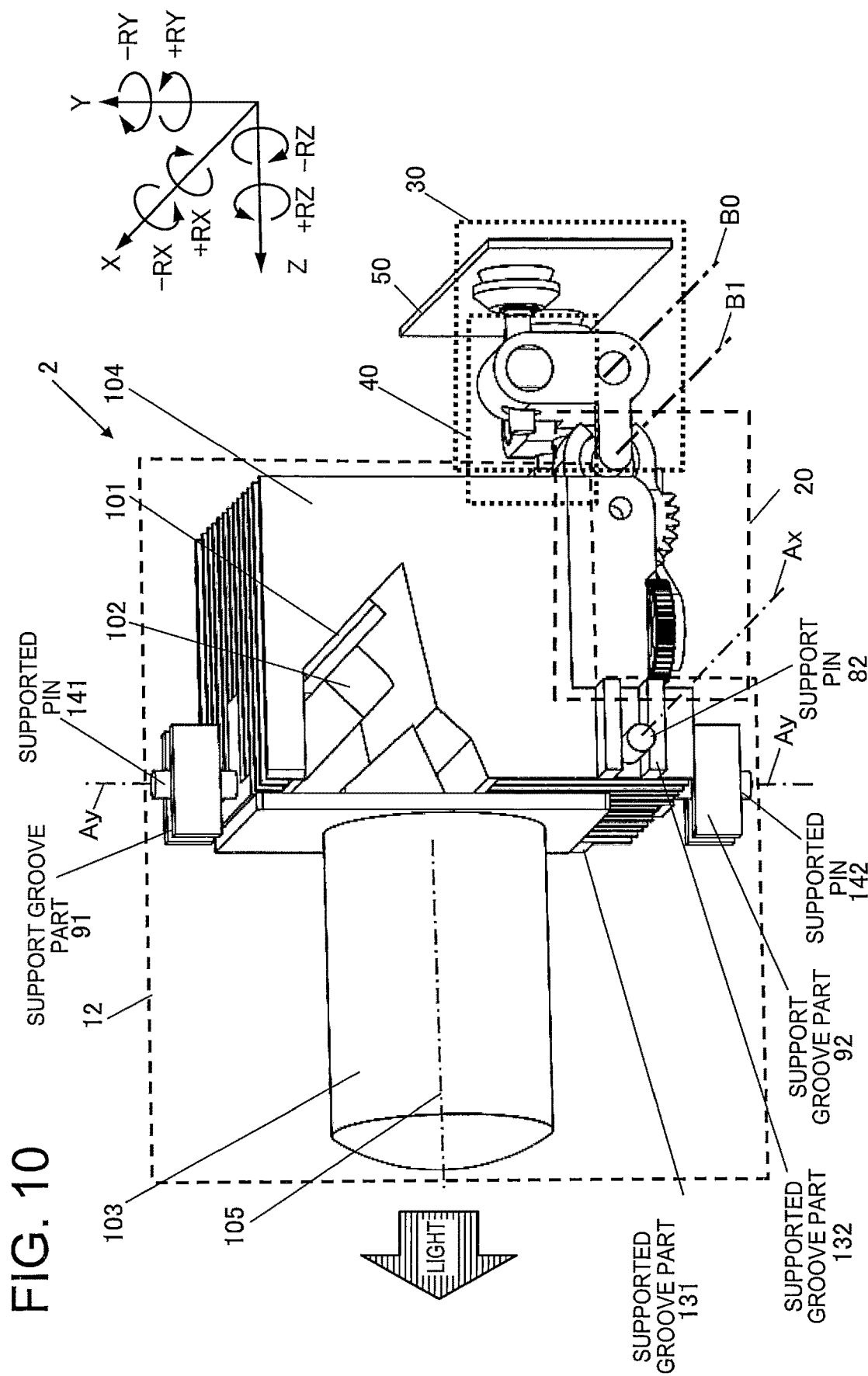
FIG. 10 is a perspective view schematically showing the structure of a headlight device according to a second embodiment of the present invention.

FIG. 10 is a perspective view schematically showing the structure of a headlight device 2 according to a second embodiment. In FIG. 10, each component identical or corresponding to a component shown in FIG. 1 is assigned the same reference character as in FIG. 1. The headlight device 2 differs from the headlight device 1 according to the first embodiment in that side faces of an optical unit 12 are provided with supported groove parts 131 and 132 and an upper surface and a lower surface of the optical unit 12 are provided with supported pins 141 and 142 and in that the support mechanism includes support pins 81 and 82 that support the supported groove parts 131 and 132 and support groove parts 91 and 92 that support the supported pins 141 and 142. Namely, in the headlight device 2 according to the second embodiment, the supported pins 111 and 112, the supported groove parts 121 and 122, the support groove parts 61 and 62 and the support pins 71 and 72 in the first embodiment are replaced with the supported groove parts 131 and 132, the supported pins 141 and 142, the support pins 81 and 82 and the support groove parts 91 and 92.

<Holding Member 104>

The holding member 104 of the optical unit 12 includes the supported pins 141 and 142 respectively on its end faces in regard to the vertical direction (±Y-axis directions). The supported pin 141 is provided on the +Y-axis side of the holding member 104. The supported pin 142 is provided on the −Y-axis side of the holding member 104.

The holding member 104 of the headlight device 2 differs from the holding member 104 of the headlight device 1 in including the supported groove parts 131 and 132 respectively on its end faces in regard to the transverse direction (±X-axis directions). The supported groove part 131 is provided on the +X-axis side of the holding member 104 and includes a supported groove extending in the Z-axis direction. The supported groove of the supported groove part 131 is an oblong hole or an oblong groove, for example. The supported groove part 132 is provided on the −X-axis side of the holding member 104 and includes a supported groove extending in the Z-axis direction. The supported groove of the supported groove part 132 is an oblong hole or an oblong groove, for example.

<Support Part 50>

The support part 50 includes the support groove parts 91 and 92. The support groove part 91 includes a support groove extending in the Z-axis direction. This support groove is an oblong hole or an oblong groove, for example. The support groove part 91 is attached to the support part 50 to be situated on the +Y-axis side of the support part 50. The support groove part 92 includes a support groove extending in the Z-axis direction. This support groove is an oblong hole or an oblong groove, for example. The support groove part 92 is attached to the support part 50 to be situated on the −Y-axis side of the support part 50.

The support part 50 includes the support pins 81 and 82. The support pin 81 is a pin having an axis parallel to the X-axis. An end part of the support pin 81 on the +X-axis side is fixed to the support part 50. The support pin 82 is a pin having an axis parallel to the X-axis. An end part of the support pin 82 on the −X-axis side is fixed to the support part 50.

<Connection to Optical Unit 12>

The optical unit 12 includes the supported pins 141 and 142. The support part 50 includes the support groove parts 91 and 92. The supported pin 141 is inserted in the support groove 91. The supported pin 142 is inserted in the support groove 92.

The optical unit 12 includes the supported groove parts 131 and 132. The support part 50 includes the support pins 81 and 82. The support pin 81 is inserted in the supported groove part 131. The support pin 82 is inserted in the supported groove part 132.

(2-2) Operation

Figure 11:
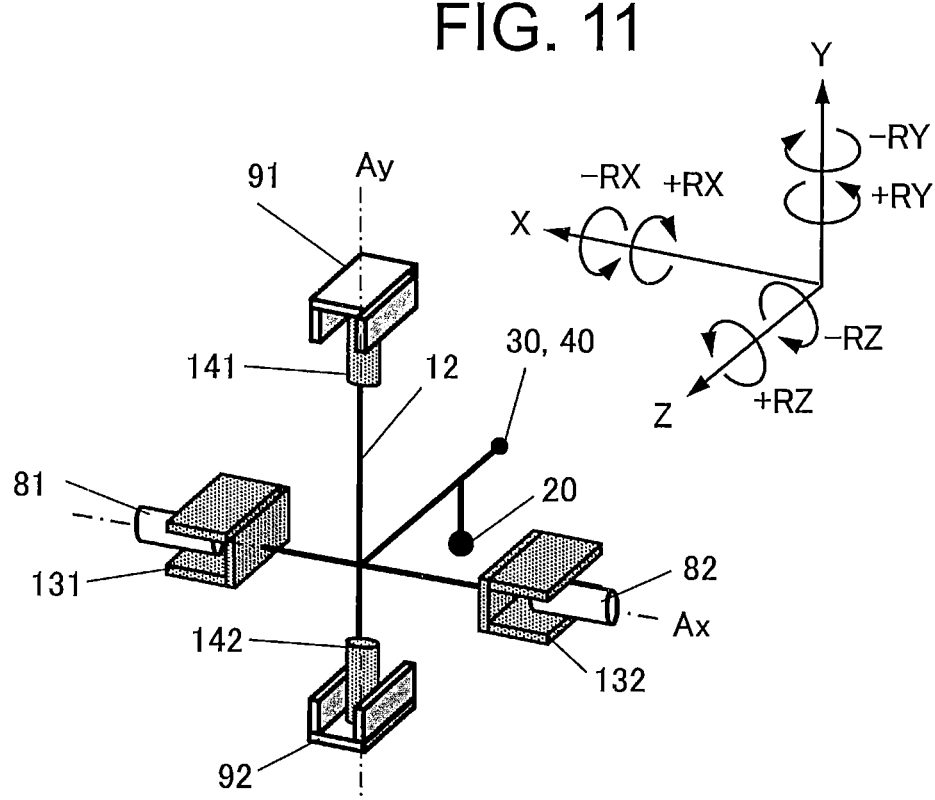
FIG. 11 is an explanatory diagram showing a supported part of an optical unit of the headlight device according to the second embodiment and a support part that supports the supported part.
Figure 12:
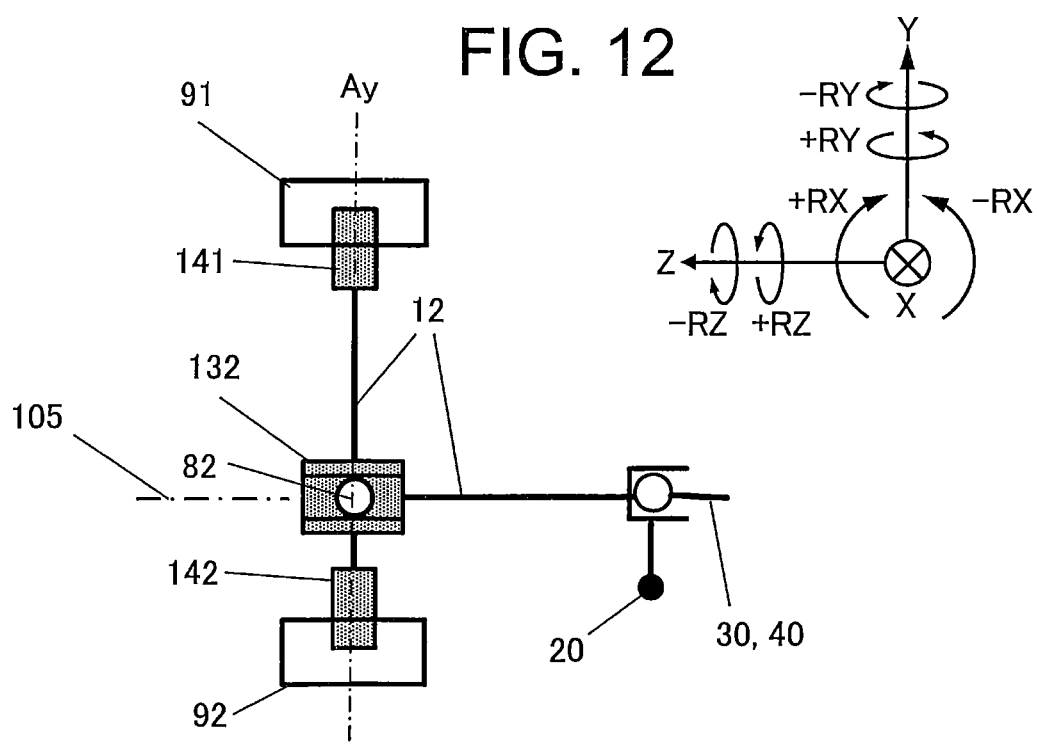
FIG. 12 is an explanatory diagram showing the operation of the headlight device shown in FIG. 10 and FIG. 11.
Figure 13:
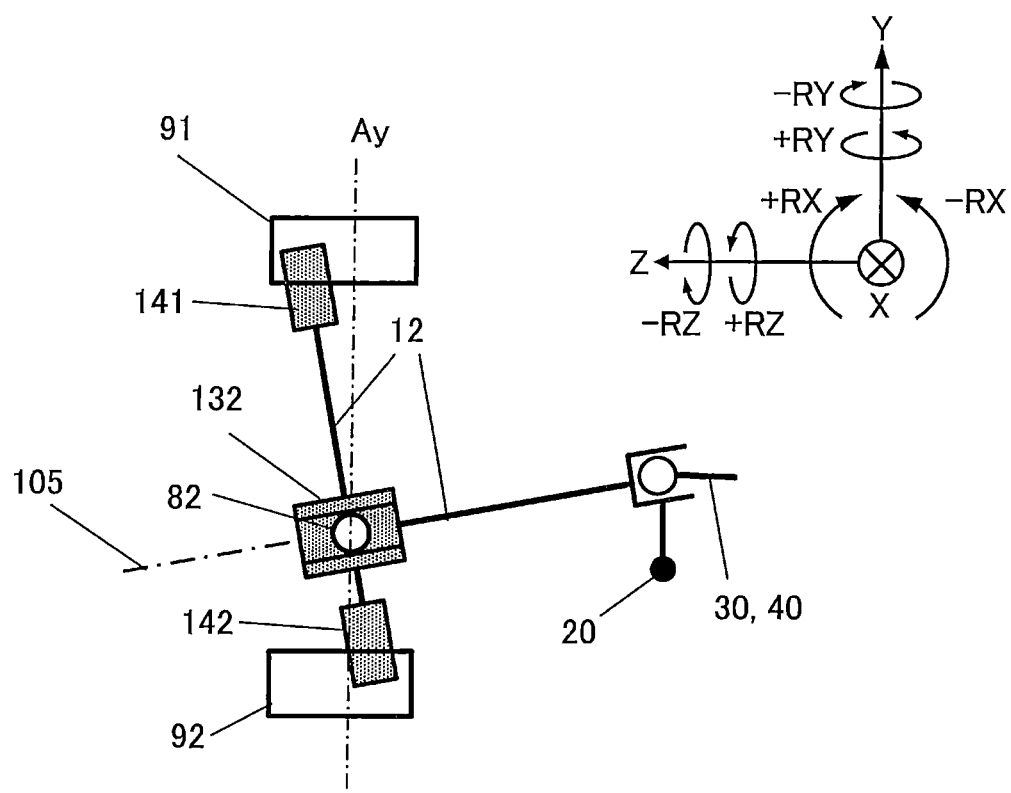
FIG. 13 is an explanatory diagram showing the operation of the headlight device shown in FIG. 10 and FIG. 11.

FIG. 11 is an explanatory diagram showing the supported groove parts 131 and 132 and the supported pins 141 and 142 of the optical unit 12 of the headlight device 2, the support pins 81 and 82, and the support groove parts 91 and 92. FIG. 12 and FIG. 13 are explanatory diagrams showing the operation of the headlight device 2 shown in FIG. 11.

The optical unit 12 includes the supported pins 141 and 142. The support part 50 includes the support groove parts 91 and 92 on the second straight line Ay. The supported pin 141 is inserted in the support groove of the support groove part 91. The supported pin 142 is inserted in the support groove of the support groove part 92.

The optical unit 12 includes the supported groove parts 131 and 132. The support part 50 includes the support pins 81 and 82 on the first straight line Ax. The support pin 81 is inserted in the supported groove of the supported groove part 131. The support pin 82 is inserted in the supported groove of the supported groove part 132.

As shown in FIG. 11 to FIG. 13, the headlight device 2 according to the second embodiment is a device obtained by replacing the supported pins 111 and 112, the supported groove parts 121 and 122, the support groove parts 61 and 62 and the support pins 71 and 72 in the headlight device 1 according to the first embodiment shown in FIG. 3 to FIG. 5 with the supported groove parts 131 and 132, the supported pins 141 and 142, the support pins 81 and 82 and the support groove parts 91 and 92. Therefore, as shown in FIG. 11 to FIG. 13, the operation of the headlight device 2 according to the second embodiment is similar to the operation of the headlight device 1 according to the first embodiment shown in FIG. 3 to FIG. 5.

The operation of the optical axis drive unit 20, the vertical adjustment unit 30 and the transverse adjustment unit 40 in the second embodiment is the same as that in the first embodiment.

(2-3) Effect

As described above, in the headlight device 2 according to the second embodiment, the optical unit 12 can be supported stably.

However, in the headlight device 2 according to the second embodiment, when the direction of the optical axis 105 of the optical unit 12 is inclined in the vertical direction by the optical axis drive unit 20 or the vertical adjustment unit 30, the grooves of the supported groove parts 131 and 132 (e.g., the supported groove part 132 shown in FIG. 13), as a rotation axis at the time of adjusting the direction of the optical axis 105 in the transverse direction, are inclined with respect to the Z-axis direction. When the direction of the optical axis 105 of the optical unit 12 is adjusted in the transverse direction in the state shown in FIG. 13, the inclination angle of the direction of the optical axis 105 of the optical unit 12 in the vertical direction can change. Therefore, the configuration of the headlight device 1 is preferable to the configuration of the headlight device 2 in terms of the accuracy of the adjustment of the direction of the optical axis 105.

(2-4) Modification

Figure 14:
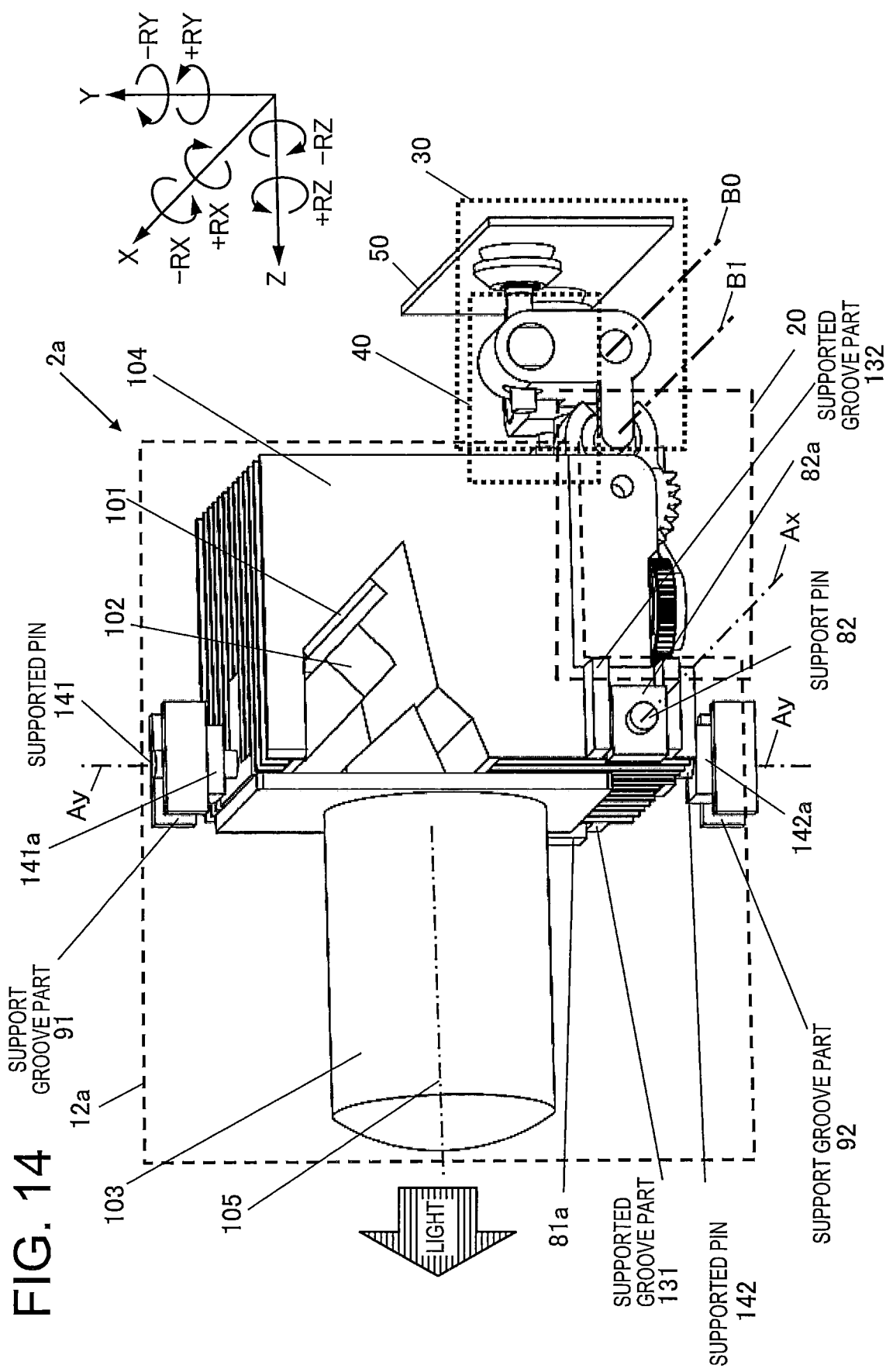
FIG. 14 is a perspective view schematically showing the structure of a headlight device according to a modification of the second embodiment.

FIG. 14 is a perspective view schematically showing the structure of a headlight device 2a according to a modification of the second embodiment. In FIG. 14, each component identical or corresponding to a component shown in FIG. 10 is assigned the same reference character as in FIG. 10. The headlight device 2a differs from the headlight device 2 shown in FIG. 10 in including support spacers 81a and 82a respectively surrounding the support pins 81 and 82 and including supported spacers 141a and 142a respectively surrounding the supported pins 141 and 142.

Figure 15:
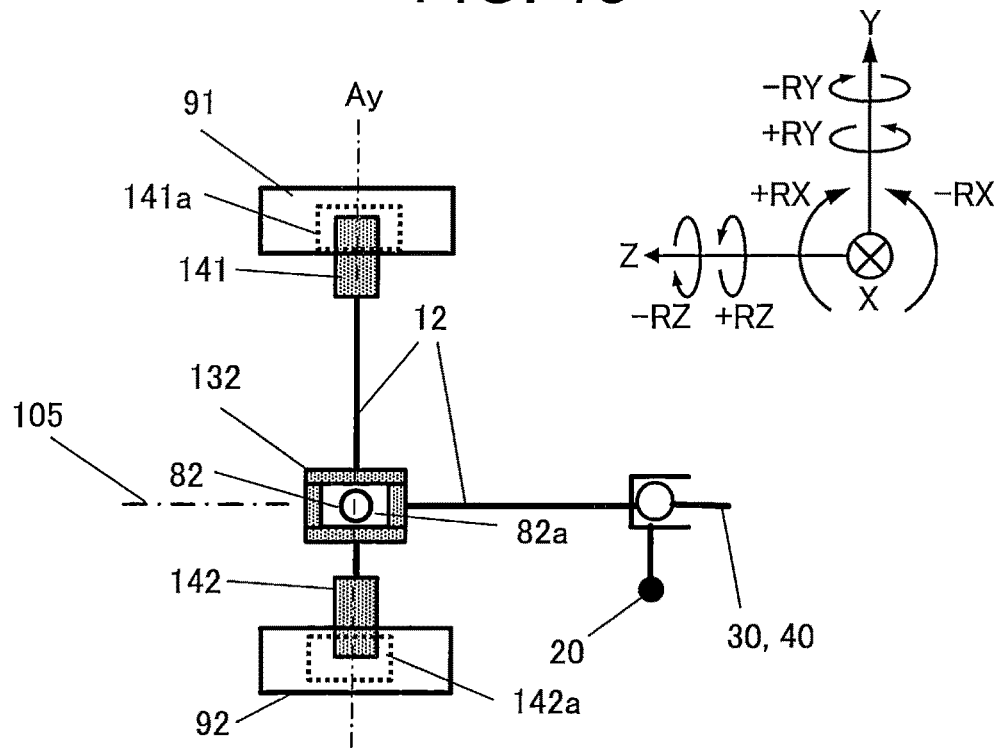
FIG. 15 is an explanatory diagram showing the operation of the headlight device shown in FIG. 14.
Figure 16:
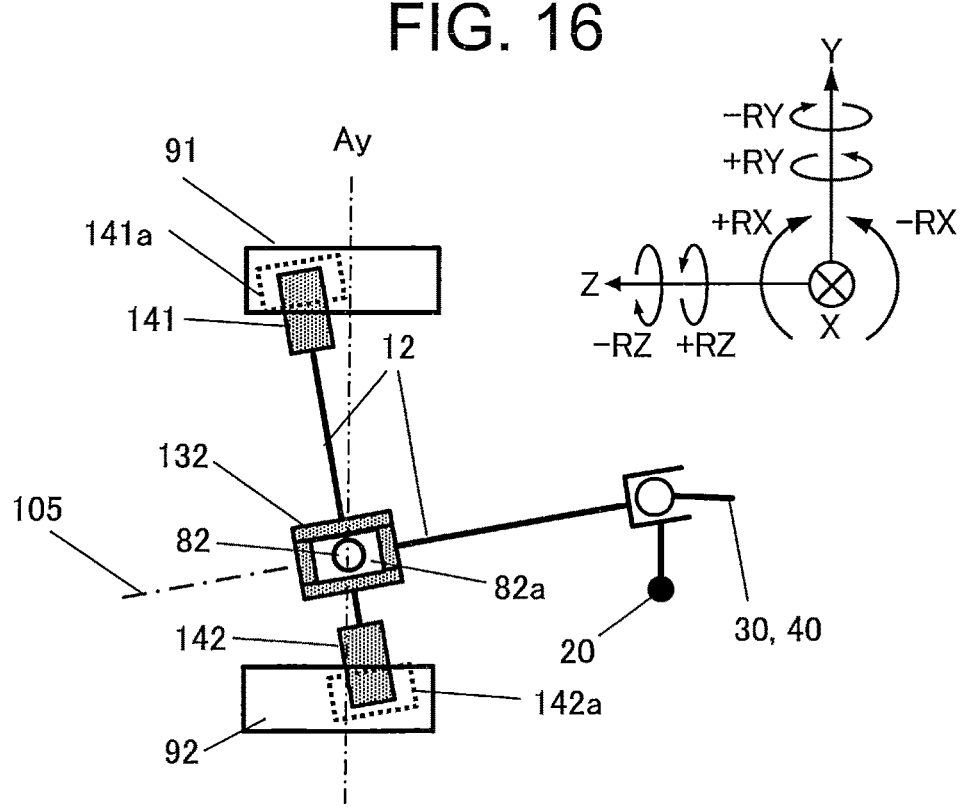
FIG. 16 is an explanatory diagram showing the operation of the headlight device shown in FIG. 14.

FIG. 15 and FIG. 16 are explanatory diagrams showing the operation of the headlight device 2a shown in FIG. 14. The support spacer 81a is inserted in a supported groove of the supported groove part 131. The support spacer 81a has a hole in which the support pin 81 is inserted. The support spacer 82a is inserted in a supported groove of the supported groove part 132. The support spacer 82a has a hole in which the support pin 82 is inserted.

The supported spacer 141a is inserted in a support groove of the support groove part 91. The supported spacer 141a has a hole in which the supported pin 141 is inserted. The supported spacer 142a is inserted in a support groove of the support groove part 92. The supported spacer 142a has a hole in which the supported pin 142 is inserted.

By the support spacers 81a and 82a and the supported spacers 141a and 142a, the performance of the support part 50 for holding the optical unit 12 can be increased further. Further, by the support spacers 81a and 82a and the supported spacers 141a and 142a, rattling between the optical unit 12 and the support part 50 can be reduced and that makes it possible to hold the optical unit 12 more stably.

Assuming that a surface including the axis of the support pins 81 and 82 provided on the holding member 104 and the vertical adjustment axis B1 where the optical axis drive unit 20 and the vertical adjustment unit 30 are connected to each other and a surface formed by loci of movement of the axis of the support pins 81 and 82 are infinite surfaces, it is desirable to configure the headlight device so that an angle formed by intersection of the two surfaces is an acute angle. With such a configuration, a pressure angle of the support pins 81 and 82 and the supported groove parts 131 and 132 becomes small and smoother operation of the optical unit 12 becomes possible.

(3) Third Embodiment (3-1) Configuration

Figure 17:
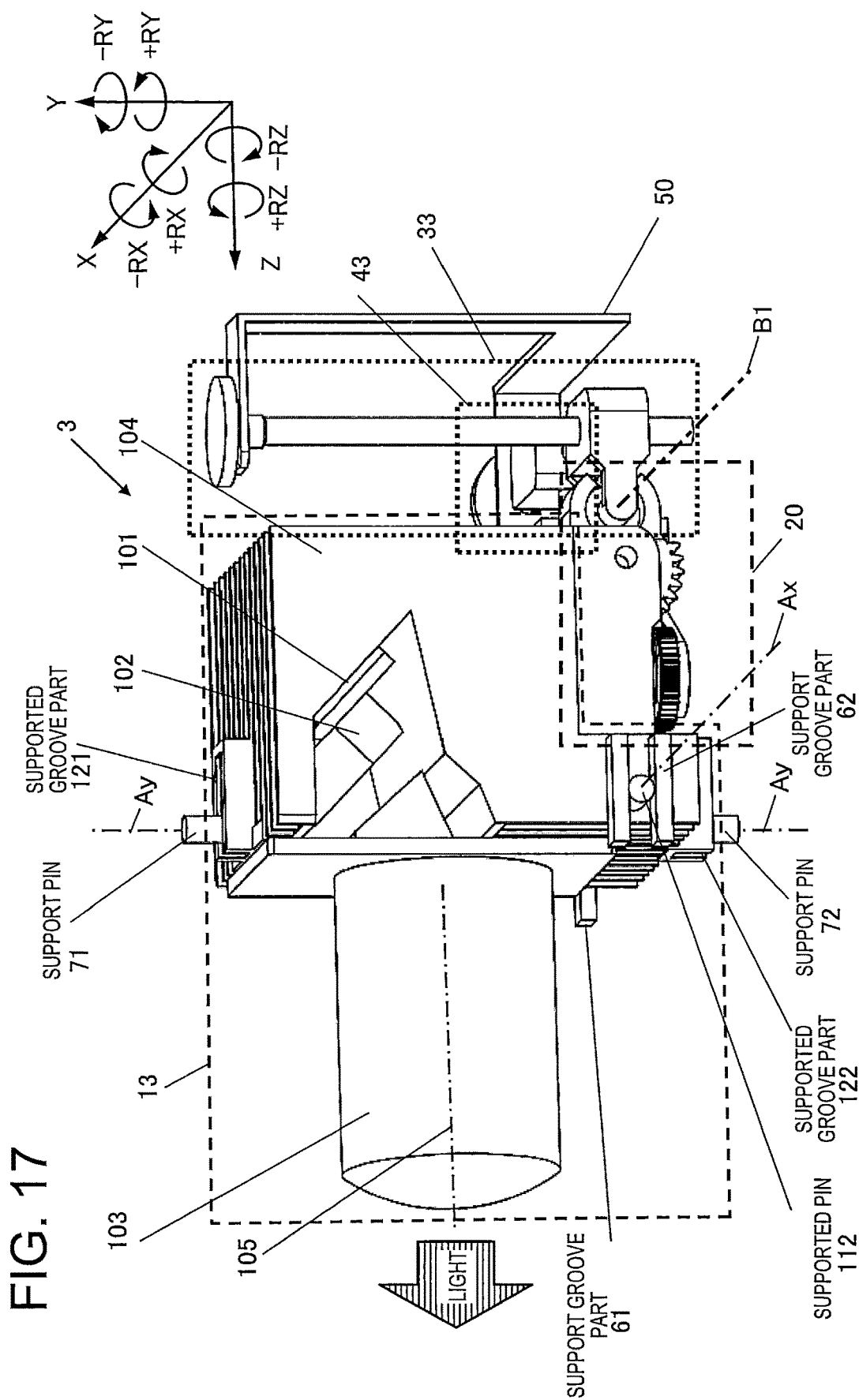
FIG. 17 is a perspective view schematically showing the structure of a headlight device according to a third embodiment of the present invention.
Figure 18:
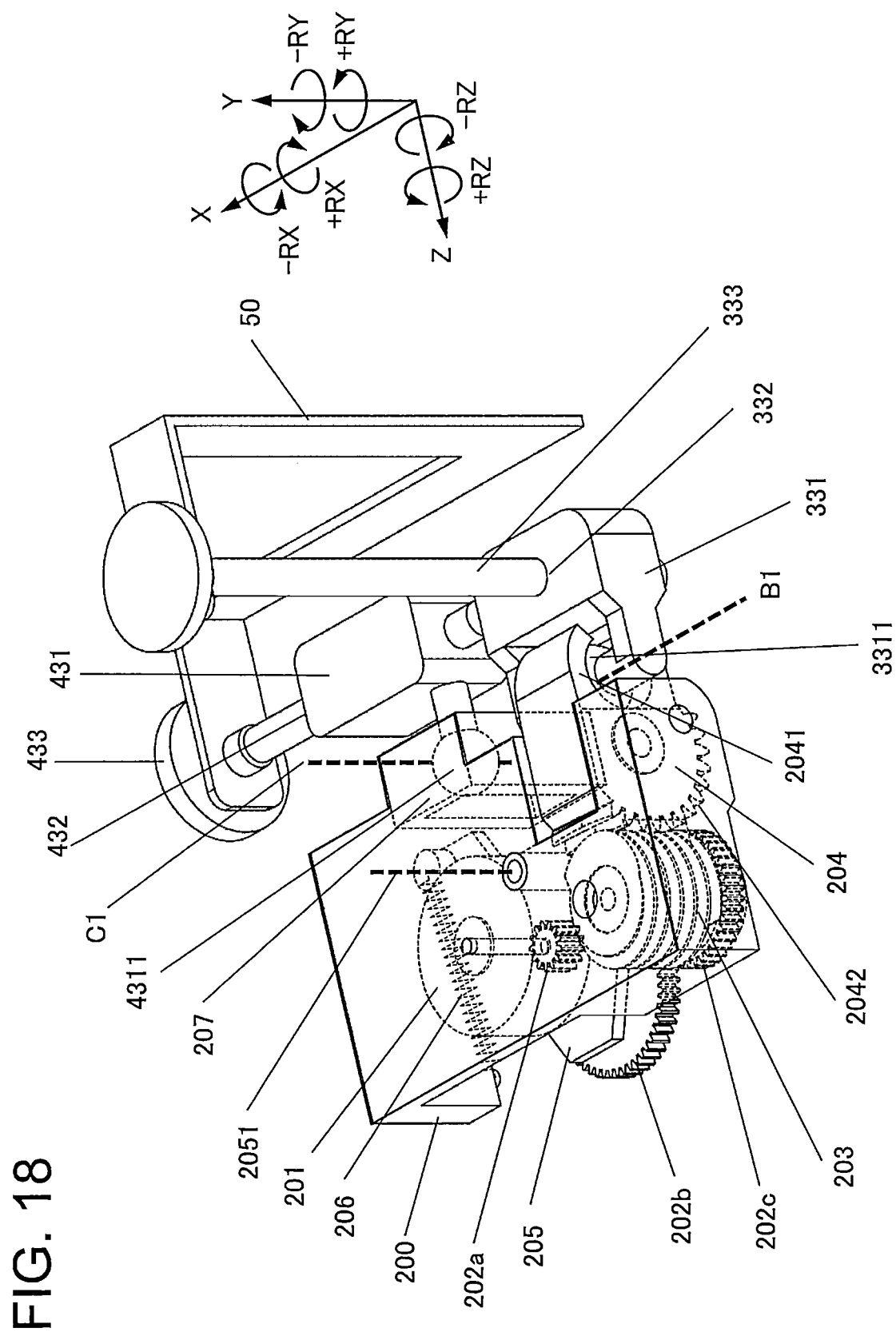
FIG. 18 is a perspective view schematically showing the structure of the optical axis drive unit, a vertical adjustment unit and a transverse adjustment unit of the headlight device according to the third embodiment.

FIG. 17 is a perspective view schematically showing the structure of a headlight device 3 according to a third embodiment. In FIG. 17, each component identical or corresponding to a component shown in FIG. 1 is assigned the same reference character as in FIG. 1. FIG. 18 is a perspective view schematically showing the structure of the optical axis drive unit 20, a vertical adjustment unit 33 and a transverse adjustment unit 43 of the headlight device 3 according to the third embodiment. In FIG. 18, each component identical or corresponding to a component shown in FIG. 2 is assigned the same reference character as in FIG. 2. The headlight device 3 according to the third embodiment differs from the headlight device 1 according to the first embodiment in the structure of the vertical adjustment unit 33 and the transverse adjustment unit 43.

<Vertical Adjustment Unit 33>

The vertical adjustment unit 33 of the headlight device 3 differs from the vertical adjustment unit 30 of the headlight device 1 shown in FIG. 1 and FIG. 2 in including a vertical adjustment slider 331, a vertical adjustment screw part 332 and an adjustment screw 333. The vertical adjustment slider 331 includes a vertical coupling part 3311. For example, the vertical coupling part 3311 is in a spherical shape and is fit in the concave part of the grip part 2041 to be freely rotatable. The vertical adjustment axis B1 is an axis parallel to the X-axis at a connection position of the grip part 2041 and the vertical coupling part 3311.

The vertical adjustment screw part 332 is a screw hole in the vertical adjustment slider 331 having an axis parallel to the Y-axis, and has a spiral groove extending in a direction orthogonal to the X-axis.

The adjustment screw 333 is rotatably held by the support part 50. The adjustment screw 333 includes a screw part having a spiral groove extending in a lengthwise direction on its outer periphery, for example.

The adjustment screw 333 is inserted in the vertical adjustment screw part 332 included in the vertical adjustment slider 331. Thus, according to rotational operation of the adjustment screw 333 in the ±RY directions, the vertical adjustment slider 331 translates (i.e., linearly moves) in the Y-axis direction. In this case, the vertical adjustment slider 331 is restricted so as not to rotate in the ±RY directions.

<Transverse Adjustment Unit 43>

The transverse adjustment unit 43 differs from the transverse adjustment unit 40 in the headlight device 1 in including a transverse adjustment slider 431, a transverse adjustment screw part 432 and an adjustment screw 433. The transverse adjustment slider 431 includes a transverse coupling part 4311. For example, the transverse coupling part 4311 is in a spherical shape and is joined to the transverse adjustment groove of the transverse adjustment groove part 207. The transverse adjustment axis C1 is an axis parallel to the Y-axis at a connection position of the transverse adjustment groove part 207 and the transverse coupling part 4311.

The transverse adjustment screw part 432 is a screw hole in the transverse adjustment slider 431 having an axis parallel to the X-axis, and has a spiral groove extending in a horizontal direction. The adjustment screw 433 is rotatably held by the support part 50. The adjustment screw 433 includes a screw part having a spiral groove extending in a lengthwise direction on its outer periphery, for example.

The adjustment screw 433 is inserted in the transverse adjustment screw part 432 included in the transverse adjustment slider 431. Thus, according to rotational operation of the adjustment screw 433 in the ±RX directions, the transverse adjustment slider 431 translates in the X-axis direction. In this case, the transverse adjustment slider 431 is restricted so as not to rotate in the ±RX directions.

(3-2) Operation

<Operation of Vertical Adjustment Unit 33>

For example, when the direction of the optical axis 105 of an optical unit 13 is adjusted in the upward direction, the vertical adjustment slider 331 is moved in the −Y-axis direction by rotating the adjustment screw 333 around its axis. When the vertical adjustment slider 331 moves in the −Y-axis direction, a coupling position of the vertical coupling part 3311 and the grip part 2041 also moves towards the −Y-axis side. The grip part 2041 is linked with the optical unit 13, and the optical unit 13 is supported to be rotatable with respect to the support part 50 at the axial position of the supported pin 111 and the supported pin 112. Thus, when the coupling position of the vertical coupling part 3311 and the grip part 2041 moves towards the −Y-axis side, the optical unit 13 rotates around the axial position of the supported pin 111 and the supported pin 112, and consequently, the direction of the optical axis 105 can be moved in the upward direction. When the direction of the optical axis 105 is adjusted in the downward direction, the adjustment screw 333 may be rotated in a direction opposite to the direction in the above description.

<Operation of Transverse Adjustment Unit>

For example, when the direction of the optical axis 105 of the optical unit 13 is adjusted in the rightward direction, the transverse adjustment slider 431 is moved in the −X-axis direction by rotating the adjustment screw 433 around its axis. Due to the movement of the transverse adjustment slider 431 in the −X-axis direction, a coupling position of the transverse coupling part 4311 and the transverse adjustment groove part 207 moves towards the −X-axis side. The transverse adjustment groove part 207 is linked with the optical unit 13, and the optical unit 13 is supported to be rotatable with respect to the support part 50 around the axial position of the support pin 71 and the support pin 72. Thus, when the coupling position of the transverse coupling part 4311 and the transverse adjustment groove part 207 moves towards the −X-axis side, the optical unit 13 rotates around the axial position of the support pin 71 and the support pin 72, and consequently, the direction of the optical axis 105 can be moved in the rightward direction. When the direction of the optical axis 105 is adjusted in the leftward direction, the adjustment screw 433 may be rotated in a direction opposite to the direction in the above description.

<Operation of Optical Axis Drive Unit 20>

The optical axis adjustment in the vertical direction by means of electric drive is the same as that in the headlight device 1.

Assuming that a surface including the axis of the supported pins 111 and 112 provided on the holding member 104 and the vertical adjustment axis B1 where the optical axis drive unit 20 and the vertical adjustment unit 33 are connected to each other and a surface formed by loci of movement of the axis of the supported pins 111 and 112 are infinite surfaces, it is desirable to configure the headlight device so that an angle formed by intersection of the two surfaces is an acute angle. With such a configuration, a pressure angle of the supported pins 111 and 112 and the support groove parts 61 and 62 becomes small and smoother operation of the optical unit 11 becomes possible.

In the grip part 2041 and the vertical coupling part 3311 of the headlight device 3, the grip part 2041 can be a convex part in a spherical shape and the vertical coupling part 3311 can be a groove extending in the X-axis direction, for example. This groove is an oblong hole or a U-shaped groove, for example.

In this case, in the transverse adjustment groove part 207 and the transverse coupling part 4311 of the headlight device 3, the transverse adjustment groove part 207 can be a convex part in a spherical shape and the transverse coupling part 4311 can be a groove extending in the Y-axis direction, for example. This groove is an oblong hole or an oblong groove, for example.

(3-3) Effect

The headlight device 3 according to the third embodiment implements the manual adjustment of the direction of the optical axis 105 of the optical unit 13 in the vertical direction and the transverse direction by a feed screw mechanism. With the headlight device 3 according to the third embodiment, the configuration of the vertical adjustment unit 33 and the transverse adjustment unit 43 can be simplified.

Incidentally, except for the above-described features, the third embodiment is the same as the first or second embodiment.

(4) Fourth Embodiment

Figure 19:
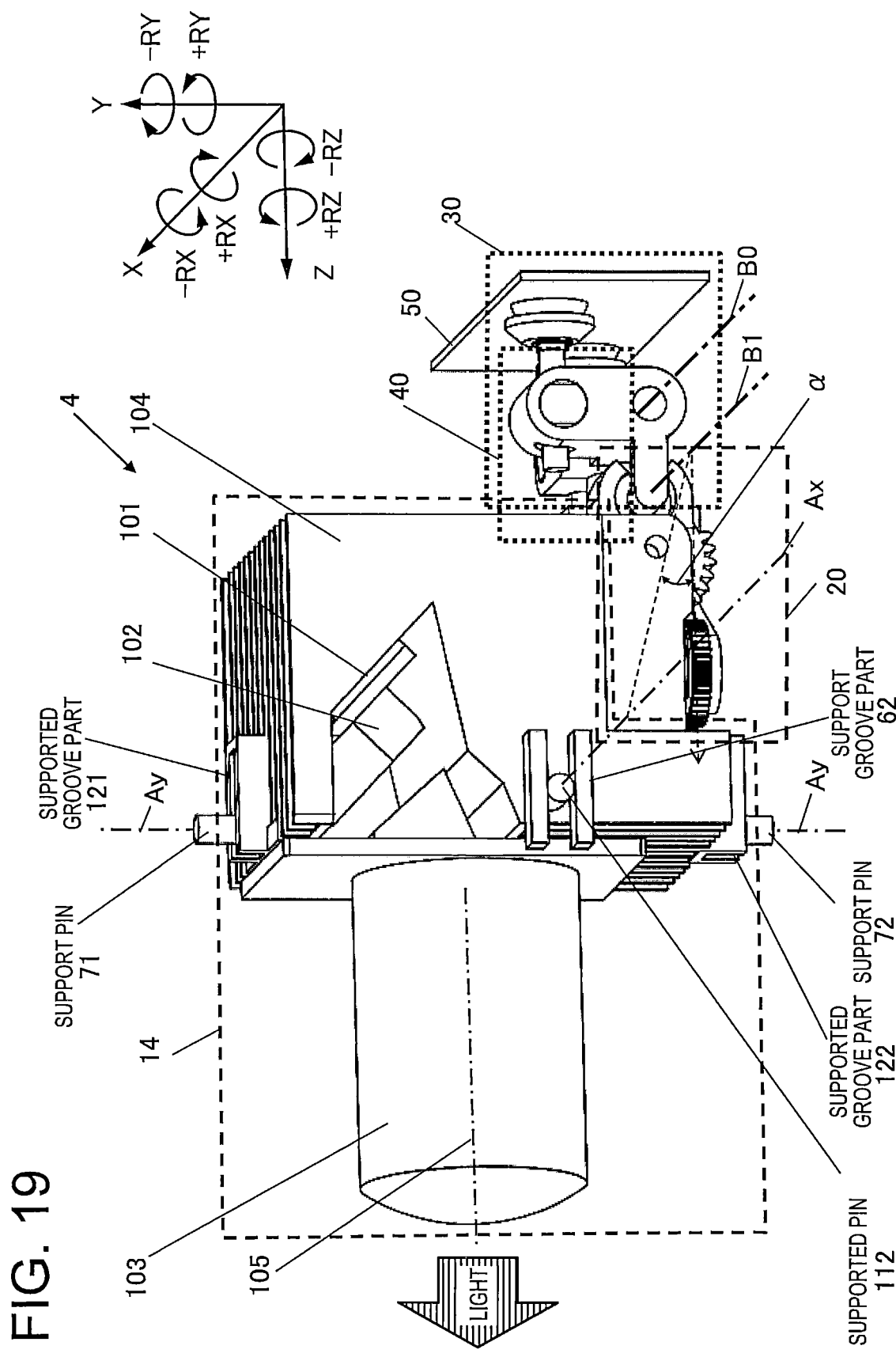
FIG. 19 is a perspective view schematically showing the structure of a headlight device according to a fourth embodiment of the present invention.

FIG. 19 is a perspective view schematically showing the structure of a headlight device 4 according to a fourth embodiment. In FIG. 19, each component identical or corresponding to a component shown in FIG. 1 is assigned the same reference character as in FIG. 1. The headlight device 4 according to the fourth embodiment differs from the headlight device 1 according to the first embodiment in the positions of the supported pin 111 (not shown in FIG. 19) and the supported pin 112 and the positions of the support groove part 61 (not shown in FIG. 19) and the support groove part 62. Namely, the headlight device 4 according to the fourth embodiment differs from the headlight device 1 according to the first embodiment in the positions of the supported pins 111 and 112 and the positions of the support groove parts 61 and 62. Specifically, in the headlight device 4, the Y-axis direction position of the supported pins 111 and 112 provided on the holding member 104 is arranged in the +Y-axis direction relative to the Y-axis direction position of the supported pins 111 and 112 in the headlight device 1 according to the first embodiment. Similarly, in the headlight device 4, the Y-axis direction position of the support groove parts 61 and 62 provided on the support part 50 is arranged in the +Y-axis direction relative to the Y-axis direction position of the support groove parts 61 and 62 in the headlight device 1 according to the first embodiment.

In the headlight device 4 according to the fourth embodiment, the position of the first straight line Ax is arranged in the +Y-axis direction relative to that in the first embodiment. Namely, in the headlight device 4 according to the fourth embodiment, a rotation axis of an optical unit 14 at the time of adjusting the direction of the optical axis 105 in the vertical direction is set at a position close to a central position of the optical unit 14. Accordingly, deviation in clearance between components in the headlight device 4 can be decreased. Further, designability of the headlight device 4 can be increased since the clearance can be reduced.

Incidentally, except for the above-described features, the fourth embodiment is the same as any one of the first to third embodiments.

(5) Fifth Embodiment

Figure 20:
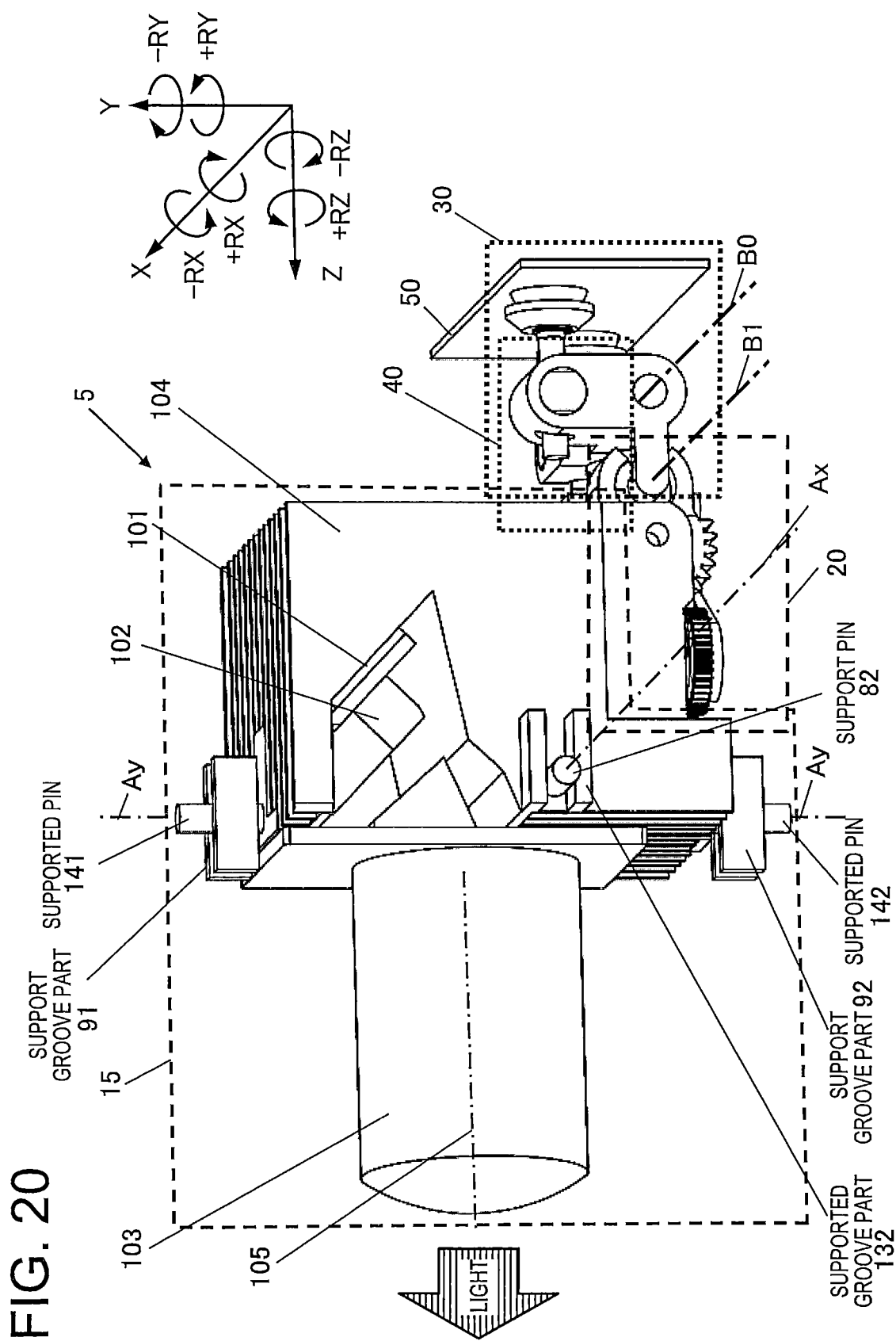
FIG. 20 is a perspective view schematically showing the structure of a headlight device according to a fifth embodiment of the present invention.

FIG. 20 is a perspective view schematically showing the structure of a headlight device 5 according to a fifth embodiment. In FIG. 20, each component identical or corresponding to a component shown in FIG. 10 is assigned the same reference character as in FIG. 10. The headlight device 5 according to the fifth embodiment differs from the headlight device 2 according to the second embodiment in the positions of the supported groove part 131 (not shown in FIG. 20) and the supported groove part 132 and the positions of the support pin 81 (not shown in FIG. 20) and the support pin 82. Namely, the headlight device 5 according to the fifth embodiment differs from the headlight device 2 according to the second embodiment in the positions of the supported groove parts 131 and 132 and the positions of the support pins 81 and 82. In the headlight device 5, the Y-axis direction position of the support pins 81 and 82 provided on the holding member 104 is arranged in the +Y-axis direction relative to the Y-axis direction position of the support pins 81 and 82 in the headlight device 2 according to the second embodiment.

In the headlight device 5 according to the fifth embodiment, the position of the first straight line Ax is arranged in the +Y-axis direction relative to that in the second embodiment. Namely, in the headlight device 5 according to the fifth embodiment, a rotation axis of an optical unit 15 at the time of adjusting the direction of the optical axis 105 in the vertical direction is set at a position close to a central position of the optical unit 15. Accordingly, deviation in clearance between components in the headlight device 5 can be decreased. Further, designability of the headlight device 5 can be increased since the clearance can be reduced.

Incidentally, except for the above-described features, the fifth embodiment is the same as any one of the first to fourth embodiments.

(6) Sixth Embodiment (6-1) Configuration

Figure 21:
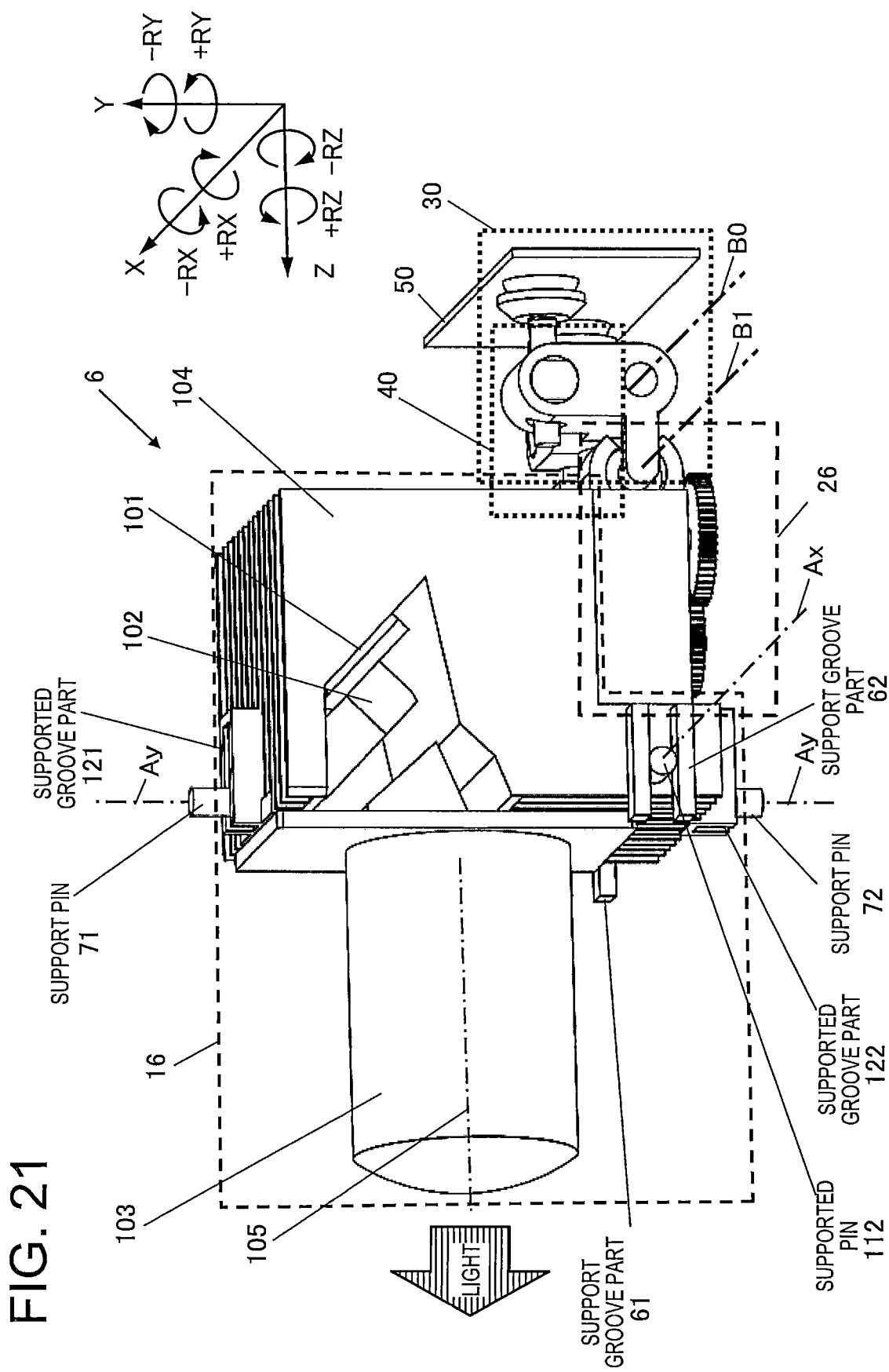
FIG. 21 is a perspective view schematically showing the structure of a headlight device according to a sixth embodiment of the present invention.
Figure 22:
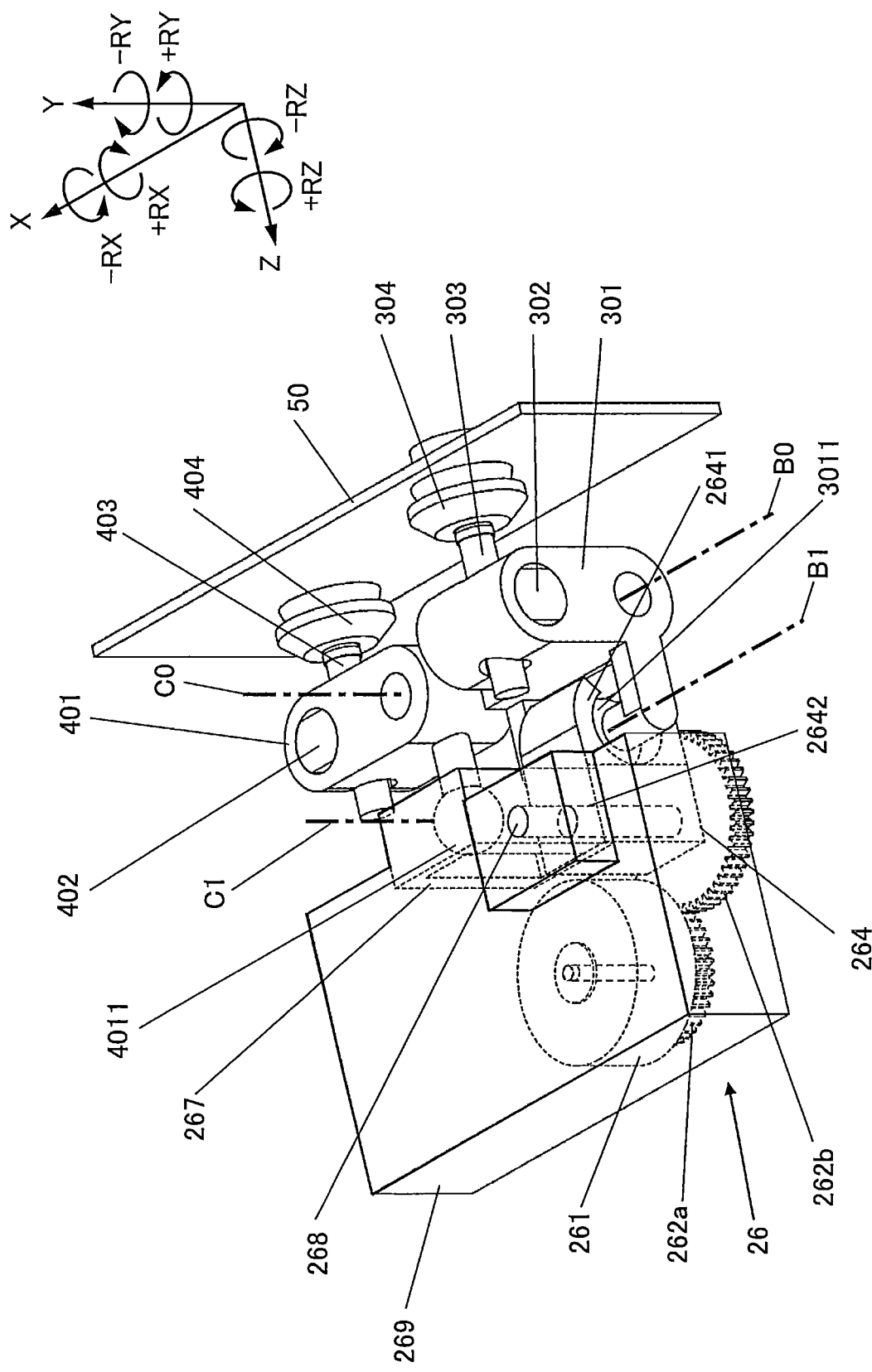
FIG. 22 is a perspective view schematically showing the structure of an optical axis drive unit, a vertical adjustment unit and a transverse adjustment unit of the headlight device according to the sixth embodiment.

FIG. 21 is a perspective view schematically showing the structure of a headlight device 6 according to a sixth embodiment. In FIG. 21, each component identical or corresponding to a component shown in FIG. 1 is assigned the same reference character as in FIG. 1. FIG. 22 is a perspective view schematically showing the structure of an optical axis drive unit 26, the vertical adjustment unit 30 and the transverse adjustment unit 40 of the headlight device 6. In FIG. 22, each component identical or corresponding to a component shown in FIG. 2 is assigned the same reference character as in FIG. 2. The headlight device 6 according to the sixth embodiment differs from the headlight device 1 according to the first embodiment in the structure of the optical axis drive unit 26.

<Optical Axis Drive Unit 26>

As shown in FIG. 22, the optical axis drive unit 26 includes a base member 269, a motor 261, a gear 262a, a gear 262b, a support member 264 and a feed screw 268. The motor 261 is attached to the base member 269. The gear 262a is attached to a rotary shaft of the motor 261.

The support member 264 is attached to the base member 269. The support member 264 is attached to be movable with respect to the base member 269 in the Y-axis direction. The support member 264 includes a grip part 2641 and a screw hole 2642. The grip part 2641 is a part of the support member 264 on the −Z-axis side. The screw hole 2642 is a part of the support member 264 on the +Z-axis side. The screw hole 2642 is a screw hole extending in the Y-axis direction.

The feed screw 268 is attached to the base member 269. The feed screw 268 is attached in a state of being rotatable with respect to the base member 269 in the ±RY directions and being restricted in translation with respect to the base member 269 in the Y-axis direction. The gear 262b is fixed to an end part of the feed screw 268.

The gear 262a engages with the gear 262b. Thus, the rotary drive force of the motor 261 is transmitted to the support member 264 via the gear 262a, the gear 262b and the feed screw 268 and moves the support member 264 in the Y-axis direction. Further, a feed screw mechanism made up of the feed screw 268 and the screw hole 2642 of the support member 264 is a non-back drive mechanism capable of continuously stopping the support member 264 even when no torque is generated by the motor 261. Thus, in the headlight device 6 according to the sixth embodiment, it is possible to drive the motor 261 when adjusting the direction of the optical axis 105 and not drive the motor 261 otherwise.

A transverse adjustment groove part 267 having a transverse adjustment groove is attached to the base member 269. The transverse adjustment groove part 267 is attached to the −Z-axis side of the base member 269. The transverse adjustment groove part 267 has the transverse adjustment groove extending in the Y-axis direction. This transverse adjustment groove is an oblong hole or an oblong groove, for example.

The optical axis drive unit 26 is attached to an optical unit 16 via the base member 269. However, the configuration of the optical axis drive unit 26 is not limited to that shown in FIG. 22. For example, it is also possible to attach a component forming the optical axis drive unit 26 directly to the holding member 104 of the optical unit 16.

The grip part 2641 as a part of the support member 264 of the optical axis drive unit 26 is connected to the vertical coupling part 3011 included in the vertical adjustment link 301 of the vertical adjustment unit 30. The vertical adjustment axis B1 is an axis parallel to the X-axis at a connection position of the grip part 2641 and the vertical coupling part 3011.

The transverse adjustment groove part 267 attached to the base member 269 of the optical axis drive unit 26 is connected to the transverse coupling part 4011 included in the transverse adjustment link of the transverse adjustment unit 40. Namely, the transverse coupling part 4011 in a spherical shape is rotatably fit in the transverse adjustment groove part 267's transverse adjustment groove extending in the Y-axis direction. The transverse adjustment axis C1 is an axis parallel to the Y-axis at a connection position of the transverse adjustment groove part 267 and the transverse coupling part 4011.

(6-2) Operation

<Operation of Optical Axis Drive Unit 26>

When the motor 261 is driven, the gear 262a and the gear 262b rotate and the feed screw 268 rotates. When the feed screw 268 rotates, the support member 264 moves in the Y-axis direction. When the support member 264 moves in the Y-axis direction, the position of the vertical adjustment axis B1 as the connection position of the grip part 2641 and the vertical coupling part 3011 moves in the Y-axis direction with respect to the optical axis drive unit 26 and the optical unit 16.

On the other hand, the vertical adjustment link 301 does not move with respect to the support part 50 unless the adjustment screw 303 rotates. Further, the optical unit 16 is supported to be rotatable with respect to the support part 50 at the axial position of the supported pins 111 and 112 and its translational operation in the Y-axis direction is restricted. Therefore, when the support member 264 moves in the Y-axis direction, the optical unit 16 rotates in the ±RX directions. Specifically, when the support member 264 moves in the +Y-axis direction, the base member 269 also moves in the +Y-axis direction, and consequently, the optical unit 16 rotates in the −RX direction. When the support member 264 moves in the −Y-axis direction, the base member 269 also moves in the −Y-axis direction, and consequently, the optical unit 16 rotates in the +RX direction.

<Operation of Vertical Adjustment Unit 30 and Transverse Adjustment Unit 40>

The operation of the vertical adjustment unit 30 and the transverse adjustment unit 40 is the same as the operation in the headlight device 1 according to the first embodiment.

Further, in the grip part 2641 and the vertical coupling part 3011 of the headlight device 6, the grip part 2641 can be in a spherical shape and the vertical coupling part 3011 can be a groove extending in the X-axis direction such as an oblong hole, a U-shaped groove or the like, for example. Furthermore, in this case, in the transverse adjustment groove part 267 and the transverse coupling part 4011 of the headlight device 6, the transverse adjustment groove part 267 can be in a spherical shape and the transverse coupling part 4011 can be a groove extending in the Y-axis direction such as an oblong hole or an oblong groove, for example.

(6-3) Effect

The headlight device 6 according to the sixth embodiment implements the optical axis adjustment by using the feed screw mechanism in the optical axis drive unit for making the optical axis adjustment in the vertical direction by means of electric drive. According to the sixth embodiment, high output power is obtained with a small number of components.

Incidentally, except for the above-described features, the sixth embodiment is the same as any one of the first to fifth embodiments.

(7) Seventh Embodiment (7-1) Configuration

Figure 23:
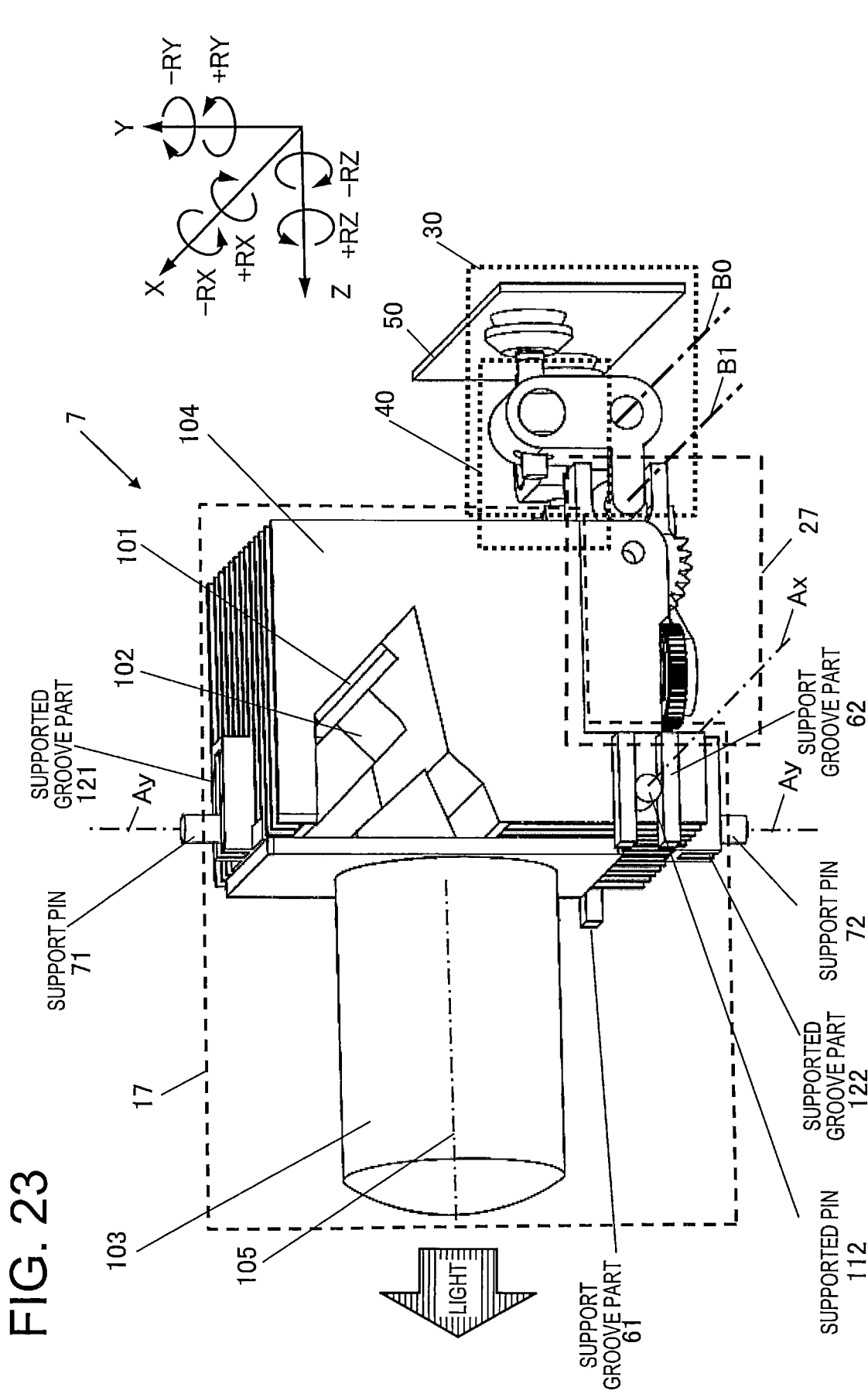
FIG. 23 is a perspective view schematically showing the structure of a headlight device according to a seventh embodiment of the present invention.
Figure 24:
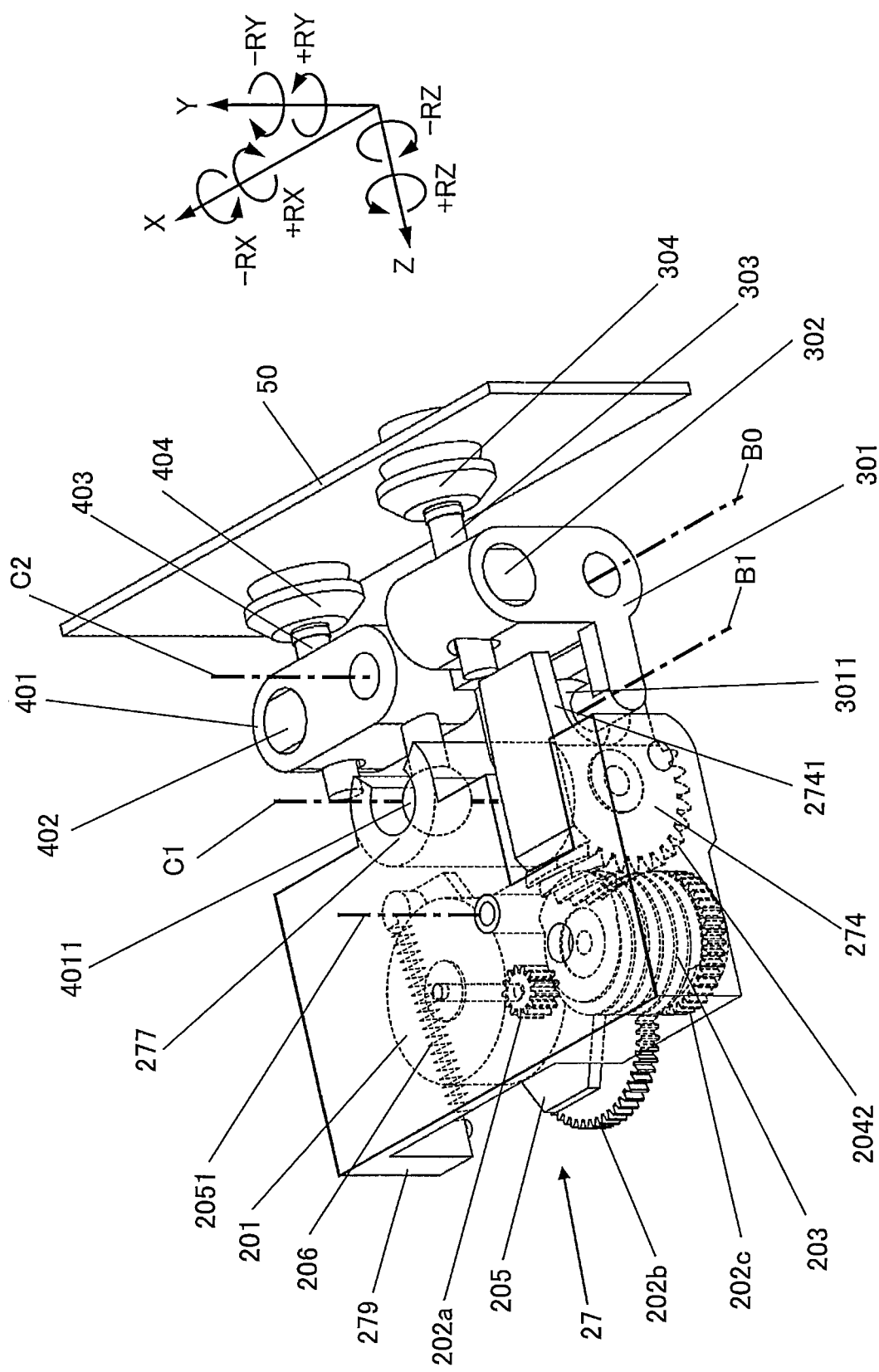
FIG. 24 is a perspective view schematically showing the structure of an optical axis drive unit, a vertical adjustment unit and a transverse adjustment unit of the headlight device according to the seventh embodiment.

FIG. 23 is a perspective view schematically showing the structure of a headlight device 7 according to a seventh embodiment. In FIG. 23, each component identical or corresponding to a component shown in FIG. 1 is assigned the same reference character as in FIG. 1. FIG. 24 is a perspective view schematically showing the structure of an optical axis drive unit 27, the vertical adjustment unit 30 and the transverse adjustment unit 40 of the headlight device 7. In FIG. 24, each component identical or corresponding to a component shown in FIG. 2 is assigned the same reference character as in FIG. 2. The headlight device 7 differs from the headlight device 1 according to the first embodiment in the structure of the optical axis drive unit 27.

<Optical Axis Drive Unit 27>

The optical axis drive unit 27 differs from the optical axis drive unit 20 shown in FIG. 2 in the shape of a support member 274 and the shape of a base member 279. The support member 274 includes a grip part 2741. The grip part 2741 is a part of the support member 274 on the −Z-axis side. The grip part 2741 has a groove, namely, a concave part, extending in the X-axis direction. The groove of the grip part 2741 is an oblong hole or a U-shaped groove, for example.

<Base Member 279>

The base member 279 differs from the base member 200 shown in FIG. 2 in including a transverse adjustment groove part 277. For example, the transverse adjustment groove part 277 is a part of the base member 279 in the −Z-axis direction. The transverse adjustment groove part 277 has a groove, namely, a concave part, extending in the Y-axis direction. The groove of the transverse adjustment groove part 277 is an oblong hole or a U-shaped groove, for example.

The optical axis drive unit 27 is attached to an optical unit 17 by using the base member 279. However, the structure of the optical axis drive unit 27 is not limited to that shown in FIG. 24. For example, it is also possible to provide a component of the optical axis drive unit 27 directly on the holding member 104 of the optical unit 17 without providing the base member 279.

The grip part 2741 as a part of the support member 274 of the optical axis drive unit 27 is connected to the vertical coupling part 3011 included in the vertical adjustment link 301 of the vertical adjustment unit 30. The vertical adjustment axis B1 is an axis parallel to the X-axis at a connection position of the grip part 2741 and the vertical coupling part 3011.

The transverse adjustment groove part 277 included in the base member 279 of the optical axis drive unit 27 is connected to the transverse coupling part 4011 included in the transverse adjustment link of the transverse adjustment unit 40. The transverse adjustment axis C1 is an axis parallel to the Y-axis at a connection position of the transverse adjustment groove part 277 and the transverse coupling part 4011.

In the grip part 2741 and the vertical coupling part 3011 of the headlight device 7, it is permissible even if the grip part 2741 is a convex part in a spherical shape and the vertical coupling part 3011 is a groove, namely, a concave part (e.g., an oblong hole or a U-shaped groove), extending in the X-axis direction, for example.

Further, in this case, in the transverse adjustment groove part 277 and the transverse coupling part 4011 of the headlight device 7, it is permissible even if the transverse adjustment groove part 277 is formed in a spherical shape and the transverse coupling part 4011 is formed as a groove extending in the Y-axis direction such as an oblong hole or an oblong groove, for example.

(7-2) Operation

<Operation of Vertical Adjustment Unit 30 and Transverse Adjustment Unit 40>

The operation of the vertical adjustment unit 30 and the transverse adjustment unit 40 is the same as the operation of the vertical adjustment unit 30 and the transverse adjustment unit 40 in the first embodiment. Further, the operation of the optical axis drive unit 27 is the same as the operation of the optical axis drive unit 20 in the first embodiment.

(7-3) Effect

As described above, in the headlight device 7 according to the seventh embodiment, the optical unit 17 can be supported stably.

Further, in the headlight device 7 according to the seventh embodiment, even when the direction of the optical axis 105 of the optical unit 17 is inclined in the vertical direction by the optical axis drive unit 27 or the vertical adjustment unit 30, the rotation axis (i.e., the second straight line Ay shown in FIG. 5) at the time of adjusting the direction of the optical axis 105 in the transverse direction is parallel to the axis of the support pins 71 and 72 and parallel to the Y-axis. Namely, the inclination angle of the direction of the optical axis 105 of the optical unit 17 in the vertical direction can be kept constant when the direction of the optical axis 105 of the optical unit 17 is adjusted in the transverse direction.

Furthermore, in the optical axis drive unit 27 for adjusting the direction of the optical axis 105 in the vertical direction by means of electric drive and the vertical adjustment unit 30 and the transverse adjustment unit 40 for manually adjusting the direction of the optical axis 105 vertically and transversely, their connection structure in the headlight device 7 according to the seventh embodiment differs from that in the headlight device 1. According to the seventh embodiment, the amount of adjustment at the time of the manual optical axis adjustment in the transverse direction can be made constant irrespective of the inclination of the optical unit 17 in the vertical direction.

Incidentally, except for the above-described features, the seventh embodiment is the same as any one of the first to sixth embodiments.

(8) Eighth Embodiment (8-1) Configuration

<Headlight Device 8>

Figure 25:
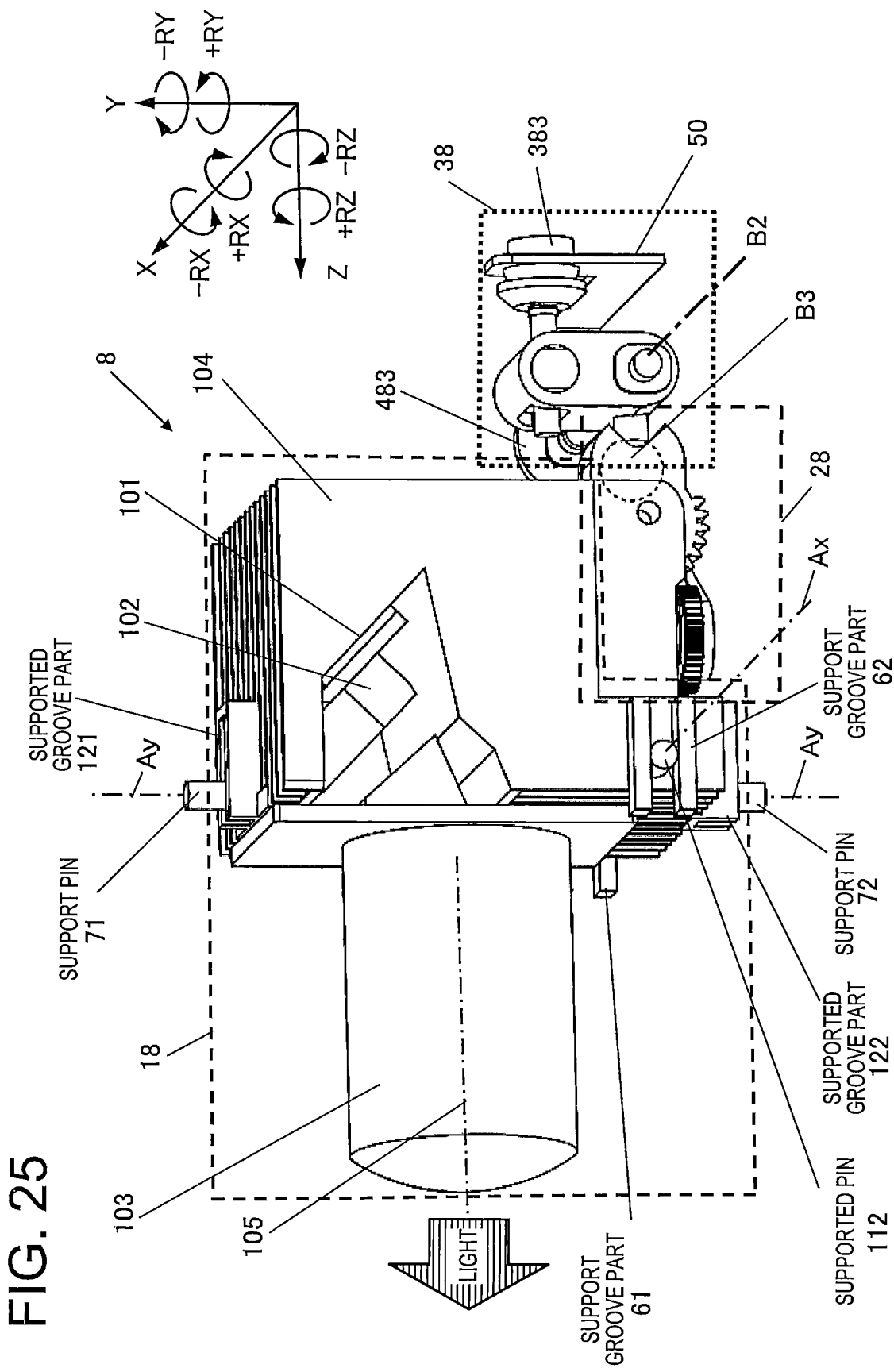
FIG. 25 is a perspective view schematically showing the structure of a headlight device according to an eighth embodiment of the present invention.
Figure 26:
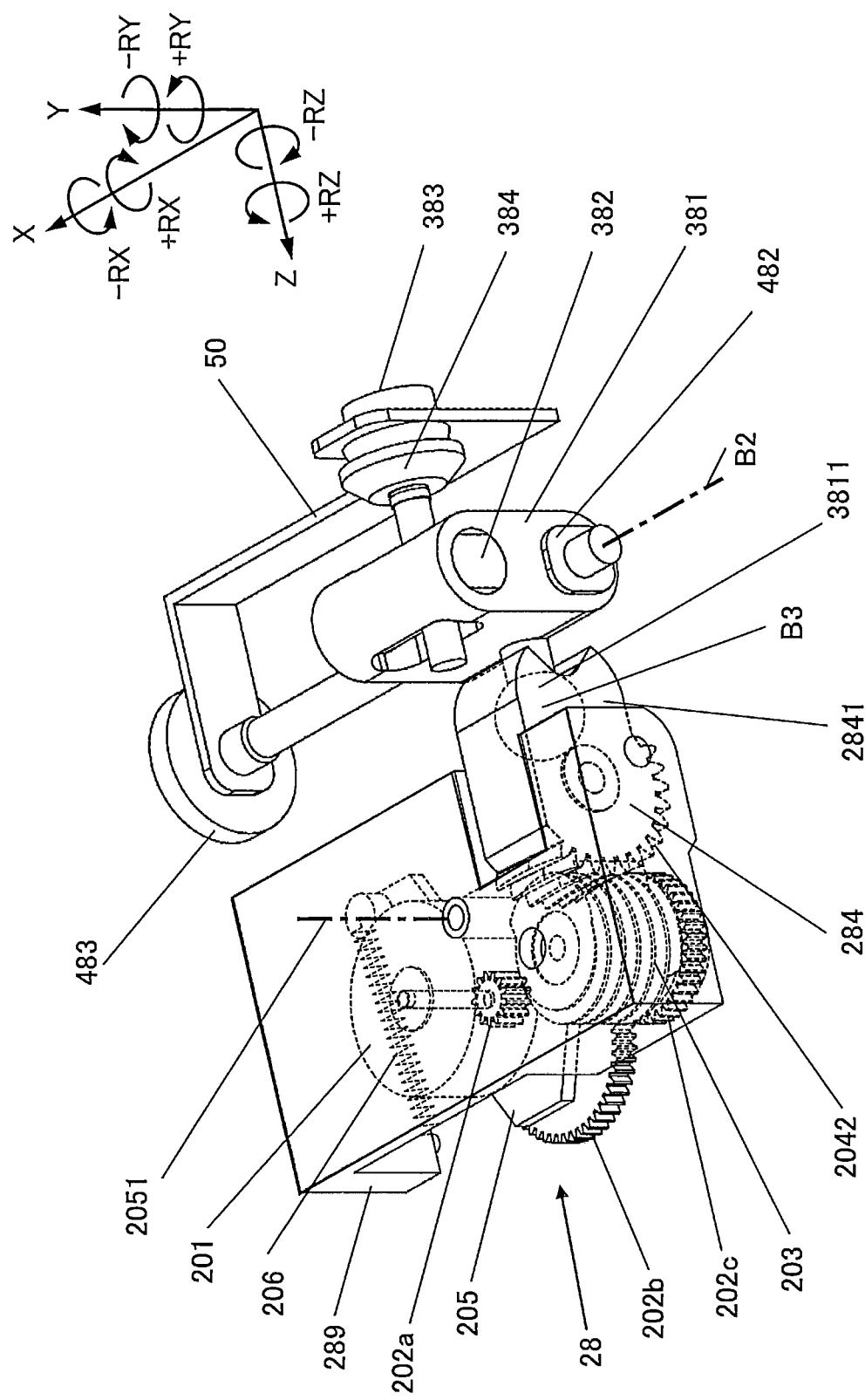
FIG. 26 is a perspective view schematically showing the structure of an optical axis drive unit and a vertical transverse adjustment unit of the headlight device according to the eighth embodiment.

FIG. 25 is a perspective view schematically showing the structure of a headlight device 8 according to an eighth embodiment. In FIG. 25, each component identical or corresponding to a component shown in FIG. 1 is assigned the same reference character as in FIG. 1. FIG. 26 is a perspective view schematically showing the structure of an optical axis drive unit 28 and a vertical transverse adjustment unit 38 of the headlight device 8. In FIG. 26, each component identical or corresponding to a component shown in FIG. 2 is assigned the same reference character as in FIG. 2. The headlight device 8 differs from the headlight device 1 according to the first embodiment in the structure of the optical axis drive unit 28 and in including the vertical transverse adjustment unit 38.

<Optical Axis Drive Unit 28>

The optical axis drive unit 28 differs from the optical axis drive unit 20 in the first embodiment in the structure of a support member 284 and the structure of a base member 289. The support member 284 includes a grip part 2841. The grip part 2841 is a part of the support member 284 on the −Z-axis side. The grip part 2841 has a concave part in a bag shape. An inner surface of the concave part is in a spherical surface shape and a part of the concave part forms a receiving part being open, for example. In the concave part of the grip part 2841, a vertical transverse coupling part 3811 as a convex part of the vertical transverse adjustment unit 38 in a spherical shape is fit to be freely rotatable.

The base member 289 differs from the base member 200 in not including the transverse adjustment groove part 207 shown in FIG. 2. The rest of the configuration of the base member 289 is the same as that of the base member 200. The optical axis drive unit 28 is attached to the optical unit 18 by using the base member 289. However, the structure of the optical axis drive unit 28 is not limited to that shown in FIG. 28. For example, it is also possible to provide a component of the optical axis drive unit 28 directly on the holding member 104 without providing the base member 289.

<Vertical Transverse Adjustment Unit 38>

As shown in FIG. 26, the vertical transverse adjustment unit 38 includes a vertical transverse adjustment link 381, a nut part 382, an adjustment screw 383, a stopper 384, a nut part 482 and an adjustment screw 483. The vertical transverse adjustment link 381 includes the vertical transverse coupling part 3811. The vertical transverse coupling part 3811 is a convex part in a spherical shape, for example. The vertical transverse adjustment link 381 is arranged to be rotatable with respect to the support part 50 around a manual adjustment axis B2. The manual adjustment axis B2 is an axis parallel to the X-axis, for example.

The nut part 382 is situated on the +Y-axis side of the vertical transverse adjustment link 381 and is held by the vertical transverse adjustment link 381 to be rotatable in the ±RX directions. Further, the nut part 382 is allowed translational operation in the X-axis direction with respect to the vertical transverse adjustment link 381. The nut part 382 is a nut part internally including a spiral groove extending in a direction orthogonal to the X-axis, for example. The adjustment screw 383 is inserted in the nut part 382. The adjustment screw 383 includes a screw part having a spiral groove extending in a lengthwise direction on its outer periphery, for example.

The −Z-axis side of the adjustment screw 383 is held by the support part 50. The −Z-axis side of the adjustment screw 383 is rotatably attached to the support part 50. Namely, the adjustment screw 383 is held by the support part 50 to allow for rotational operations in the ±RX directions, the ±RY directions and the ±RZ directions around one certain point. Alternatively, the adjustment screw 383 may be held to allow for rotational operations in the ±RZ directions and the ±RX directions with respect to the support part 50.

The adjustment screw 383 is inserted in the stopper 384. The adjustment screw 383 is fixed with respect to the support part 50 by the stopper 384. By the rotational operation of the adjustment screw 383 in the ±RZ directions, the inclination angle of the vertical transverse adjustment link 381 with respect to the support part 50 around the manual adjustment axis B2 is adjusted.

The nut part 482 is situated on the −Y-axis side of the vertical transverse adjustment link 381, attached to the vertical transverse adjustment link 381 in a state of being rotatable in the ±RX directions, and attached to the vertical transverse adjustment link 381 so as not to move in the X-axis direction. Further, the nut part 482 is restricted in rotational operation with respect to the support part 50 in the ±RX directions. The nut part 482 internally includes a screw hole having a spiral groove extending in the X-axis direction, for example.

The adjustment screw 483 is rotatably held by the support part 50. The adjustment screw 483 includes a screw part having a spiral groove extending in a lengthwise direction on its outer periphery, for example.

The adjustment screw 483 is inserted in the screw hole of the nut part 482 included in the vertical transverse adjustment link 381. The adjustment screw 483 and the screw hole of the nut part 482 are coupled to each other by screw structure. Therefore, the nut part 482 translates in the X-axis direction in response to the rotational operation of the adjustment screw 483 in the ±RX directions. Further, in sync with the translation of the nut part 482 in the X-axis direction, the vertical transverse adjustment link 381 translates in the X-axis direction.

The vertical transverse coupling part 3811 included in the vertical transverse adjustment link 381 of the vertical transverse adjustment unit 38 is connected to the grip part 2841 as a part of the support member 284 of the optical axis drive unit 28. Accordingly, the vertical transverse adjustment unit 38 is connected to the optical axis drive unit 28 in a state of allowing for the rotational operations in the ±RX directions, the ±RY directions and the ±RZ directions around one certain point.

(8-2) Operation

<Operation of Vertical Transverse Adjustment Unit 38>

When the direction of the optical axis 105 of an optical unit 18 is manually adjusted in the vertical direction, a user performs an operation of rotating the adjustment screw 383 in the ±RZ directions similarly to the case of the headlight device 1.

When the direction of the optical axis 105 of the optical unit 18 is manually adjusted in the transverse direction, the user performs an operation of rotating the adjustment screw 483 in the ±RX directions similarly to the case of the headlight device 3. When the direction of the optical axis 105 is adjusted in the transverse direction, the optical unit 18 rotates in the ±RY directions around a straight line passing through the support pins 71 and 72 due to the translation of the vertical transverse adjustment link 381 in the X-axis direction.

Since the nut part 382 included in the vertical transverse adjustment link 381 is freely translatable in the X-axis direction with respect to the vertical transverse adjustment link 381, the vertical transverse adjustment link 381 including the nut part 382 does not rotate in the ±RX directions and is capable of maintaining the vertical direction position of the optical unit 18.

On the other hand, while the vertical transverse adjustment link 381 is rotating in the ±RX directions due to the operation of rotating the adjustment screw 383, the nut part 482 rotates freely with respect to the vertical transverse adjustment link 381 and rotation of the nut part 482 with respect to the support part 50 in the ±RX directions is restricted, and thus the transverse direction position of the optical unit 18 can be maintained.

<Operation of Optical Axis Drive Unit 28>

The optical axis adjustment in the vertical direction by the optical axis drive unit 28 is the same as that by the optical axis drive unit 20 in the headlight device 1.

While the above description has been given of an example in which the convex part of the vertical transverse coupling part 3811 is fit in the concave part of the grip part 2841 to be freely rotatable, it is permissible even if the grip part 2841 has a convex part in a spherical shape and the vertical transverse coupling part 3811 has a concave part in a bag shape.

(8-3) Effect

As described above, the headlight device 8 according to the eighth embodiment has the structure in which the optical axis drive unit 28 for adjusting the direction of the optical axis 105 of the headlight device 8 in the vertical direction by driving the motor 201 and the vertical transverse adjustment unit 38 for manually adjusting the direction of the optical axis 105 in the vertical and transverse directions are linked with each other at one point. Accordingly, the headlight device 8 according to the eighth embodiment is capable of reducing the size of the device.

Incidentally, except for the above-described features, the eighth embodiment is the same as any one of the first to seventh embodiments.

(9) Modification

While the transverse adjustment unit, the vertical adjustment unit and the vertical transverse adjustment unit have been described as mechanisms for manually changing the direction of the optical axis 105 of the headlight device in the first to eighth embodiments, it is also possible to employ a structure that makes these adjustments by rotary drive force of a motor.

It is possible to appropriately combine the configurations in the first to eighth embodiments.

(10) Appendixes

Based on the above embodiments, the contents of the present invention will be described below as appendixes.

<Appendix 1>

A headlight device comprising:

an optical unit to emit light; and a support mechanism to support the optical unit, wherein the optical unit includes a first supported part and a second supported part, the support mechanism includes a first support part that is provided on a first straight line in a predetermined first direction and contacts the first supported part and a second support part that is provided on a second straight line in a second direction orthogonal to the first direction and contacts the second supported part, the support mechanism supports the optical unit to be freely rotatable around the first straight line passing through the first support part and freely rotatable around the second straight line passing through the second support part, the first supported part includes a supported pin, the first support part includes a support groove part having a support groove extending in a third direction orthogonal to both the first direction and the second direction and contacting the supported pin, the second supported part includes a supported groove part having a supported groove extending in the third direction, and the second support part includes a support pin contacting the supported groove.

<Appendix 2>

A headlight device comprising:

an optical unit to emit light; and a support mechanism to support the optical unit, wherein the optical unit includes a first supported part and a second supported part, the support mechanism includes a first support part that is provided on a first straight line in a predetermined first direction and contacts the first supported part and a second support part that is provided on a second straight line in a second direction orthogonal to the first direction and contacts the second supported part, the support mechanism supports the optical unit to be freely rotatable around the first straight line passing through the first support part and freely rotatable around the second straight line passing through the second support part, the first supported part includes a supported pin and a supported spacer surrounding the supported pin, the first support part includes a support groove part having a support groove extending in a third direction orthogonal to both the first direction and the second direction and contacting the supported spacer, the second supported part includes a supported groove part having a supported groove extending in the third direction, and the second support part includes a support pin and a support spacer surrounding the support pin and contacting the supported groove.

<Appendix 3>

A headlight device comprising:

an optical unit to emit light; and a support mechanism to support the optical unit, wherein the optical unit includes a first supported part and a second supported part, the support mechanism includes a first support part that is provided on a first straight line in a predetermined first direction and contacts the first supported part and a second support part that is provided on a second straight line in a second direction orthogonal to the first direction and contacts the second supported part, the support mechanism supports the optical unit to be freely rotatable around the first straight line passing through the first support part and freely rotatable around the second straight line passing through the second support part, the first supported part includes a supported groove part having a supported groove extending in a third direction orthogonal to both the first direction and the second direction, the first support part includes a support pin contacting the supported groove, the second supported part includes a supported pin, and the second support part includes a support groove part having a support groove extending in the third direction and contacting the supported pin.

<Appendix 4>

A headlight device comprising:

an optical unit to emit light; and a support mechanism to support the optical unit, wherein the optical unit includes a first supported part and a second supported part, the support mechanism includes a first support part that is provided on a first straight line in a predetermined first direction and contacts the first supported part and a second support part that is provided on a second straight line in a second direction orthogonal to the first direction and contacts the second supported part, the support mechanism supports the optical unit to be freely rotatable around the first straight line passing through the first support part and freely rotatable around the second straight line passing through the second support part, the first supported part includes a supported groove part having a supported groove extending in a third direction orthogonal to both the first direction and the second direction, the first support part includes a support pin and a support spacer surrounding the support pin and contacting the supported groove, the second supported part includes a supported pin and a supported spacer surrounding the supported pin, and the second support part includes a support groove part having a support groove extending in the third direction and contacting the supported spacer.

DESCRIPTION OF REFERENCE CHARACTERS 1-8, 1a, 2a: headlight device, 11-18: optical unit, 20, 26, 27, 28: optical axis drive unit, 20a: optical axis drive unit, 30, 33: vertical adjustment unit, 38: vertical transverse adjustment unit, 40, 43: transverse adjustment unit, 50: support part, 61, 62: support groove part, 71, 72: support pin, 71a, 72a: support spacer, 81, 82: support pin, 81a, 82a: supported spacer, 91, 92: support groove part, 101: light source unit, 102: optical member, 103: optical member, 104: holding member, 105: optical axis, 111, 112: supported pin, 111a, 112a: supported spacer, 121, 122: supported groove part, 131, 132: supported groove part, 141, 142: supported pin, 141a, 142a: supported spacer, 200: base member, 201: motor, 203: worm screw, 204: support member, 2041: grip part, 2042: worm wheel part, 205: rotary base, 206: elastic member, 207: transverse adjustment groove part, 301: vertical adjustment link, 3011: vertical coupling part, 381: vertical transverse adjustment link, 401: transverse adjustment link, 4011: transverse coupling part, 501: light source drive unit, 511: inclination sensor, 521: angle sensor, 530: control unit, Ax: first straight line, Ay: second straight line, B0: vertical rotation axis, B1: vertical adjustment axis, C0: transverse rotation axis, C1: transverse adjustment axis.

What is claimed is:

1. A headlight device comprising:

a light source to emit light; and a support structure to support the light source, wherein the light source includes a first supported part and a second supported part, the support structure includes a first support part that is provided on a first straight line in a predetermined first direction and contacts the first supported part and a second support part that is provided on a second straight line in a second direction orthogonal to the first direction and contacts the second supported part, the support structure supports the light source to be freely rotatable around the first straight line passing through the first support part and freely rotatable around the second straight line passing through the second support part, one of the first supported part and the second supported part includes a pin and the other thereof is a groove extending in a third direction orthogonal to both the first direction and the second direction, and one of the first support part and the second support part that supports the groove includes a pin and the other thereof is a groove extending in the third direction.

2. The headlight device according to claim 1, wherein the first support part supports the first supported part to be freely movable in the third direction, and the second support part supports the second supported part to be freely movable in the third direction.

3. The headlight device according to claim 1, wherein each of the first support part and the first supported part including the pin a the one of the first supported part and the second supported part further includes a spacer surrounding the pin of the one of the first supported part and the second supported part.

4. The headlight device according to claim 1, wherein the second straight line intersects with the first straight line.

5. The headlight device according to claim 1, further comprising an optical axis driver to apply drive force for rotating the light source around the first straight line to the light source.

6. The headlight device according to claim 1, further comprising a first adjuster to apply force for rotating the light source around the first straight line to the light source by means of a manual operation.

7. The headlight device according to claim 1, further comprising a second adjuster to apply force for rotating the light source around the second straight line to the light source by means of a manual operation.

8. The headlight device according to claim 1, further comprising:
an optical axis driver to apply drive force for rotating the light source around the first straight line to the light source; and
a first adjuster to be linked with the optical axis driver and to apply force for rotating the light source around the first straight line to the light source via the optical axis driver,
wherein a second direction position of a connection position where the optical axis driver and the first adjuster are connected to each other is within ±1 cm of a second direction position of the first straight line.

9. The headlight device according to claim 1, further comprising:
an optical axis driver to apply drive force for rotating the light source around the first straight line to the light source; and
a first adjuster to be linked with the optical axis driver and to apply force for rotating the light source around the first straight line to the light source via the optical axis driver,
wherein in a rotary drive range around the first straight line, there exists a position where the pin and a vertical adjustment axis at a connection position of the optical axis driver and the first adjuster become parallel to the first direction.

10. The headlight device according to claim 1, wherein the first direction and the second direction are respectively a transverse direction and a vertical direction of a vehicle on which the headlight device is mounted.

11. The headlight device according to claim 5, further comprising:
an inclination sensor to detect an inclination angle of an optical axis of the light source with respect to a first reference plane orthogonal to the second direction; and
control circuitry to control the optical axis driver based on the inclination angle.

12. The headlight device according to claim 5, further comprising:
another optical axis driver to apply drive force for rotating the light source around the second straight line to the light source;
an angle sensor to detect an angle of an optical axis of the light source with respect to a second reference plane orthogonal to the first direction; and
control circuitry to control said another optical axis driver based on the angle.

13. The headlight device according to claim 5, wherein the optical axis driver includes:
a worm wheel part that rotates around an axis line in the first direction and thereby rotates the light source around the first straight line;
a worm screw that engages with the worm wheel part; and
a motor that applies drive force for rotating the worm screw.

14. The headlight device according to claim 7, wherein the second adjuster includes a transverse coupling part that is linked with the light source, and
the second straight line is situated in an emission direction of the light relative to the transverse coupling part.

15. The headlight device according to claim 8, wherein an angle of a straight line passing through a point on the connection position and orthogonally intersecting with the first straight line with respect to a plane orthogonal to the second direction is less than or equal to 45 degrees.

16. The headlight device according to claim 8, wherein the optical axis driver includes a first concave part,
the first adjuster includes a first convex part, and
the first convex part is held in the first concave part to be freely rotatable.

17. The headlight device according to claim 13, wherein the optical axis driver further includes:
a base that is fixed to the light source;
a rotary base that issupported to be rotatable around a shaft fixed to the light source and supports the worm screw and the motor; and
an elastic that applies force for rotating the rotary base around the shaft and pressing the worm screw against the worm wheel part to the rotary base.

18. The headlight device according to claim 16, wherein the first concave part has an inner surface in a spherical surface shape, and
the first convex part has a tip end part in a spherical shape contacting the inner surface in the spherical surface shape.

* * * * *